(12) United States Patent
Shigemura

(10) Patent No.: US 10,192,106 B2
(45) Date of Patent: Jan. 29, 2019

(54) MOVING OBJECT DETECTION APPARATUS AND MOVING OBJECT DETECTION METHOD

(71) Applicant: DENSO CORPORATION, Kariya, Aichi-pref. (JP)

(72) Inventor: Shusaku Shigemura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 158 days.

(21) Appl. No.: 15/111,141

(22) PCT Filed: Jan. 9, 2015

(86) PCT No.: PCT/JP2015/000070
§ 371 (c)(1),
(2) Date: Jul. 12, 2016

(87) PCT Pub. No.: WO2015/107877
PCT Pub. Date: Jul. 23, 2015

(65) Prior Publication Data
US 2016/0335489 A1     Nov. 17, 2016

(30) Foreign Application Priority Data
Jan. 14, 2014 (JP) .................................. 2014-03894

(51) Int. Cl.
*H04N 7/18* (2006.01)
*G06T 7/20* (2017.01)
(Continued)

(52) U.S. Cl.
CPC ............ *G06K 9/00369* (2013.01); *B60R 1/00* (2013.01); *G06K 9/00362* (2013.01);
(Continued)

(58) Field of Classification Search
CPC ........... G06K 9/00369; G06K 9/00805; G06K 2009/6213; H04N 7/181; G06T 7/2093;
(Continued)

(56) References Cited

U.S. PATENT DOCUMENTS 5,777,690 A * 7/1998 Takeda .................... G01S 11/12
                                                          348/155
9,826,200 B2 * 11/2017 Stein ....................... H04N 7/183
(Continued)

FOREIGN PATENT DOCUMENTS

JP     2009-237898 A     10/2009
JP     2012-220377 A     11/2012

*Primary Examiner* — Zaihan Jiang
(74) *Attorney, Agent, or Firm* — Knobbe, Martens, Olson & Bear, LLP

(57) ABSTRACT

A moving object detection apparatus that analyzes a photographic image captured by an onboard camera and detects a moving object is provided. The moving object detection apparatus includes an imaging portion that captures the photographic image at a predetermined time interval; a peripheral region detection portion that detects a first moving object of a size smaller than a predetermined size and a second moving object of a size larger than the predetermined size as the moving object in a peripheral region; and a central region detection portion that detects the first moving object as the moving object in a central region. The central region detection portion detects the first moving object and the second moving object as the moving object when the second moving object has been detected in the peripheral region at a previous time.

14 Claims, 17 Drawing Sheets

(51) Int. Cl.
*G06T 7/00* (2017.01)
*G06K 9/00* (2006.01)
*G08G 1/16* (2006.01)
*B60R 1/00* (2006.01)
*G06T 7/73* (2017.01)
*G06T 7/62* (2017.01)
*G06K 9/62* (2006.01)
*G06K 9/32* (2006.01)

(52) U.S. Cl.
CPC ............ *G06K 9/00805* (2013.01); *G06T 7/20* (2013.01); *G06T 7/62* (2017.01); *G06T 7/74* (2017.01); *G08G 1/166* (2013.01); *H04N 7/181* (2013.01); *B60R 2300/105* (2013.01); *B60R 2300/303* (2013.01); *B60R 2300/307* (2013.01); *B60R 2300/8033* (2013.01); *G06K 2009/3291* (2013.01); *G06K 2009/6213* (2013.01); *G06T 2207/10016* (2013.01); *G06T 2207/20021* (2013.01); *G06T 2207/30196* (2013.01); *G06T 2207/30261* (2013.01)

(58) Field of Classification Search
CPC ......... G06T 7/0081; G06T 2207/20021; G06T 2207/30196; B60R 1/00; B60R 2300/105; B60R 2300/303; B60R 2300/307; B60R 2300/8033; G08G 1/166

USPC ...................................................... 348/148
See application file for complete search history.

(56) References Cited

U.S. PATENT DOCUMENTS

| | | | | |
|---|---|---|---|---|
| 2002/0049527 | A1* | 4/2002 | Kohno | G08G 1/0104 701/117 |
| 2010/0021009 | A1* | 1/2010 | Yao | G06K 9/00785 382/103 |
| 2011/0150284 | A1* | 6/2011 | Son | G06T 7/2033 382/103 |
| 2011/0228981 | A1* | 9/2011 | Harres | G06T 7/75 382/103 |
| 2012/0213405 | A1* | 8/2012 | Sasaki | G06K 9/00791 382/103 |
| 2013/0177207 | A1* | 7/2013 | Yokota | G06K 9/78 382/103 |
| 2013/0223686 | A1* | 8/2013 | Shimizu | G08G 1/166 382/103 |
| 2013/0245881 | A1* | 9/2013 | Scarbrough | G07C 5/0891 701/36 |
| 2013/0345944 | A1* | 12/2013 | Kasiraj | B60W 30/16 701/96 |
| 2015/0043771 | A1* | 2/2015 | Wu | G06K 9/00785 382/103 |
| 2016/0004321 | A1* | 1/2016 | Takada | G02B 27/01 345/156 |

* cited by examiner

FIG. 8

| | | DETECTION RESULT IN CENTRAL REGION | | | |
|---|---|---|---|---|---|
| | | NO DETECTION RESULT | NEITHER IS DETECTED | DETECT 1ST MOVING OBJECT | DETECT 2ND MOVING OBJECT |
| DETECTION RESULT IN PERIPHERAL REGION | NO DETECTION RESULT | TP1 <br> TP2 | | | |
| | NEITHER IS DETECTED | | TP1 <br> — | TP1 <br> (TP2a) | TP1 <br> TP2 |
| | DETECT 1ST MOVING OBJECT | | TP1 <br> — | TP1 <br> (TP2a) | TP1 <br> TP2 |
| | DETECT 2ND MOVING OBJECT | | TP1 <br> TP2 | TP1 <br> TP2 | TP1 <br> TP2 |

FIG. 9

|  |  | DETECTION RESULT IN CENTRAL REGION | | | |
|---|---|---|---|---|---|
|  |  | NO DETECTION RESULT | NEITHER IS DETECTED | DETECT 1ST MOVING OBJECT | DETECT 2ND MOVING OBJECT |
| DETECTION RESULT IN PERIPHERAL REGION | NO DETECTION RESULT |  |  |  |  |
|  | NEITHER IS DETECTED |  |  |  |  |
|  | DETECT 1ST MOVING OBJECT |  |  | TP1 TP2 |  |
|  | DETECT 2ND MOVING OBJECT |  |  |  |  |

UPPER REGION RH

LOWER REGION RL

PHOTOGRAPHIC IMAGE VL
BY LEFT ONBOARD CAMERA 10L

PHOTOGRAPHIC IMAGE VR
BY RIGHT ONBOARD CAMERA 10R

PERIPHERAL REGION RP

CENTRAL REGION RC

PERIPHERAL REGION RP

MOVING OBJECT DETECTION APPARATUS AND MOVING OBJECT DETECTION METHOD

CROSS-REFERENCE TO RELATED APPLICATIONS

The present application is based on Japanese Patent Application No. 2014-3894 filed on Jan. 14, 2014, the disclosure of which is incorporated herein by reference.

TECHNICAL FIELD

The present disclosure relates to a technique which detects a moving object from an image captured by an onboard camera.

BACKGROUND ART

As a technique in a related art (for example, Patent Literature 1) to detect a moving object such as a pedestrian and a vehicle, a pattern matching is applied to a photographic image obtained by capturing an image in front of or around a vehicle using an onboard camera. According to the technique in the related art, a template (a pedestrian template) representing a characteristic figure of a pedestrian and a template (a vehicle template) representing a characteristic figure of a vehicle are stored, and a moving object in the photographic image is detected by extracting a portion matching the templates from the photographic image.

A moving object such as a pedestrian and a vehicle may be everywhere in the photographic image. In order to avoid omission detection of a moving object, it is necessary to extract portions matching the templates by searching everywhere in the photographic image while moving positions of the templates in the photographic image little by little. In addition, moving objects may be of any size in the photographic image. It is necessary to detect moving objects in the photographic image by preparing templates of various sizes and moving a position of the templates of various sizes in the photographic image little by little.

The inventor of the present application has found the followings. When all portion of the photographic image is searched thoroughly with templates of various sizes, a search time may become too long to detect a moving object quickly.

PRIOR ART LITERATURE

Patent Literature

Patent Literature 1: JP 2012-220377 A

SUMMARY OF INVENTION

It is an object of the present disclosure to provide a technique by which a moving object in a photographic image can be detected quickly without a possibility of a detection omission.

According to one aspect of the present disclosure, a moving object detection apparatus and a moving object detection method that analyzes a photographic image captured by an onboard camera and detects a moving object in the photographic image are provided. The moving object detection apparatus includes an imaging portion that captures the photographic image at a predetermined time interval, a peripheral region detection portion that detects a first moving object of a size smaller than a predetermined size and a second moving object of a size larger than the predetermined size as the moving object in a peripheral region provided on each of right and left sides in the photographic image, and a central region detection portion that detects the first moving object as the moving object in a central region provided at a center of the photographic image. The central region detection portion detects the first moving object and the second moving object as the moving object when the second moving object has been detected in the peripheral region of the photographic image obtained at a previous time.

According to another aspect of the present disclosure, a moving object detection apparatus that analyzes a photographic image captured by an onboard camera connected to an imaging portion capturing the photographic image at a predetermined time interval, and detects a moving object in the photographic image is provided. The moving object detection apparatus includes a peripheral region detection portion and a central region detection portion.

According to the moving object detection apparatus and the moving object detection method of the present disclosure, it may be possible to quickly detect a moving object in a photographic image without a possibility of detection omission.

BRIEF DESCRIPTION OF DRAWINGS

The above and other aspects, features and advantages of the present disclosure will become more apparent from the following detailed description made with reference to the accompanying drawings. In the drawings:

FIG. 8 is a diagram exemplifying a table referred to when the central region detection template is set;

FIG. 9 is a diagram exemplifying a table referred to when peripheral region detection template is set;

DESCRIPTION OF EMBODIMENTS

Embodiments will be described to make contents of the present disclosure.

(Apparatus Configuration)

Figure 1:
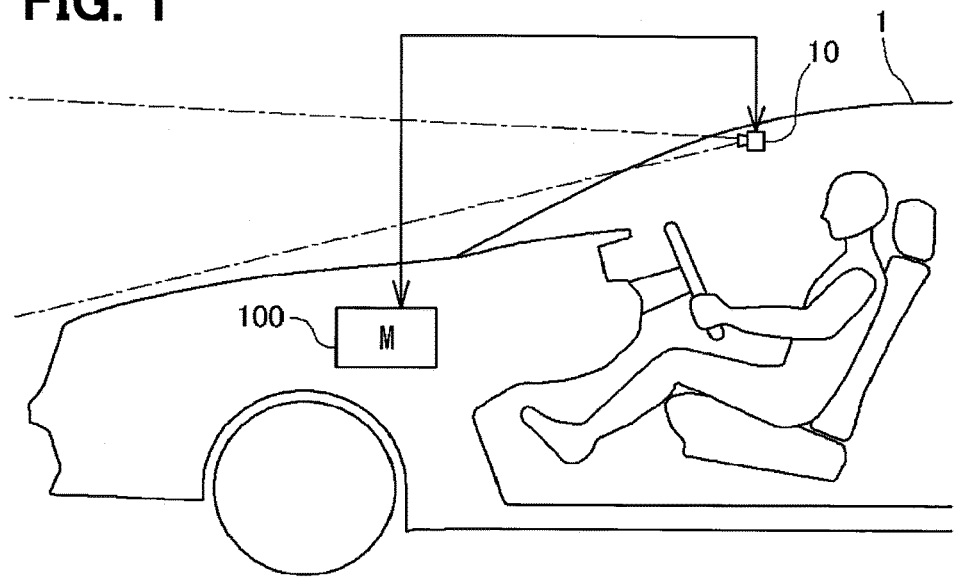
FIG. 1 is a diagram illustrating a vehicle equipped with a moving object detection apparatus of the present embodiments.

FIG. 1 shows a vehicle 1 equipped with a moving object detection apparatus 100 according to the present embodiment. The moving object detection apparatus 100 of the present embodiment is equipped to the vehicle 1 together with an onboard camera 10 which captures images in front of the vehicle 1. The onboard camera may be referred to as a vehicle-mounted camera. The onboard camera 10 includes an image sensor such as a CMOS, a CCD, or the like. The onboard camera 10 outputs image data of a frontward image at a constant frequency of 30 Hz, under the control of the moving object detection apparatus 100. A main component of the moving object detection apparatus 100 is a microcomputer in which a CPU, a ROM, a RAM or the like are connected via a bus. The moving object detection apparatus 100 successively reads photographic images captured by the onboard camera 10, and detects a moving object (a pedestrian, a vehicle, a bicycle, or the like) in the photographic images.

The present embodiment will be described on the assumption that the onboard camera 10 captures a series of images at a constant frequency. It is sufficient to capture multiple images at a predetermined time interval, and images are not necessarily captured in series. For example, the following description applies exactly the same to a case where two images or three images are captured at a predetermined time interval.

Figure 2:
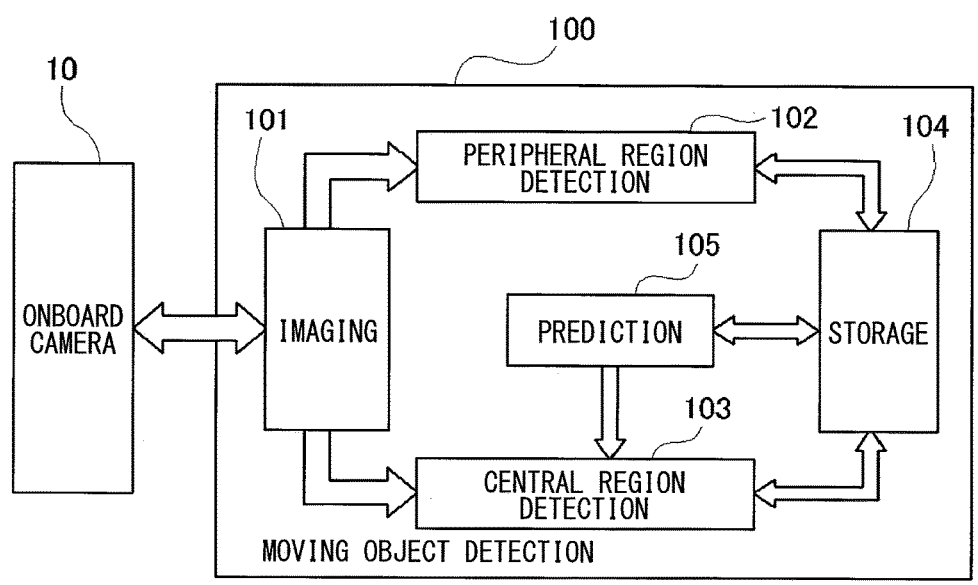
FIG. 2 is a diagram illustrating a rough internal configuration of the moving object detection apparatus.

FIG. 2 shows a rough internal configuration of the moving object detection apparatus 100. As described in the drawing, the moving object detection apparatus 100 of the present embodiment includes an imaging portion 101, a peripheral region detection portion 102, a central region detection portion 103, a prediction portion 105, and a storage portions 104. These five "portion" represent an abstract concept according to which the interior of the moving object detection apparatus 100 is divided for convenience in terms of a function of the moving object detection apparatus 100 to detect a moving object in a photographic image, and do not mean that the moving object detection apparatus 100 is physically divided to five portions. The "portions" may be realized by a computer program executed on the CPU, an electronic circuit including an LSI, or a combination of the computer program and the electronic circuit.

Figure 20:
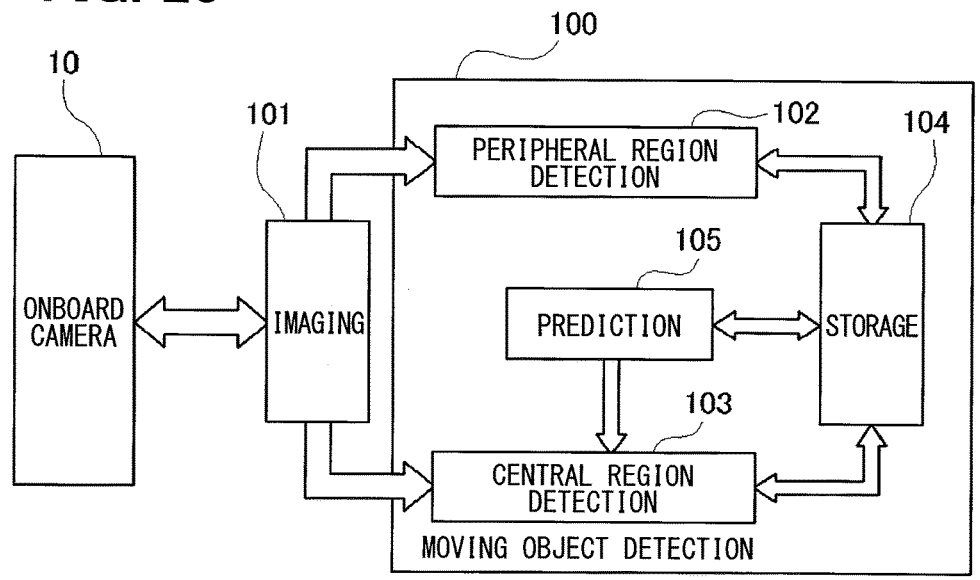
FIG. 20 is a diagram illustrating a rough internal configuration of the moving object detection apparatus.

It should be noted that the moving object detection apparatus 100 and the imaging portion 101 may be provided separately (see FIG. 20).

The imaging portion 101 is connected to the onboard camera 10 and therefore not only controls an operation of the onboard camera 10 but also obtains a photographic image generated in the onboard camera 10. The imaging portion 101 once stores the photographic image received from the onboard camera 10 into an internal buffer, and later outputs the photographic image to each of the peripheral region detection portion 102 and the central region detection portion 103.

Upon receipt of the photographic image, the peripheral region detection portion 102 detects a moving object in peripheral regions of the photographic image. A region covering a predetermined range on each of right and left sides of a photographic image is defined as the peripheral region. When a moving object in the peripheral regions is detected, the peripheral region detection portion 102 detects a moving object by reading out templates pre-stored in the storage portion 104 and searching the peripheral regions of the photographic image. The peripheral region detection portion 102 stores an obtained detection result into the storage portion 104. The templates pre-stored in the storage portion 104 will be described below.

Upon receipt of a photographic image from the imaging portion 101, the central region detection portion 103 detects a moving object in a central region of the photographic image. Although it will be described in detail below, a region covering a predetermined range at a center of a photographic image is defined as the central region. As with the peripheral region detection portion 102, when a moving object is detected, the central region detection portion 103 detects a moving object by reading out templates from the storage portion 104 and stores a detection result into the storage portion 104.

Templates used to detect a moving object are pre-stored in the storage portion 104. Detection results of moving objects obtained by the peripheral region detection portion 102 and the central region detection portion 103 are also stored in the storage portion 104. The storage portion 104 does not have to store all the detection results obtained by the peripheral region detection portion 102 and the central region detection portion 103, and it is sufficient to store a predetermined number of latest detection results (for example, last five detection results).

The prediction portion 105 reads out detection results of moving objects obtained by the peripheral region detection portion 102 and the central region detection portion 103 from the storage portion 104. The prediction portion 105 predicts a detection result of a moving object in a photographic image obtained next. A prediction result is outputted to the central region detection portion 103. A method by which the prediction portion 105 predicts a detection result of a moving object will be described below.

In the present embodiment, the imaging portion 101 corresponds to "an imaging portion" of the present disclosure. The peripheral region detection portion 102 corresponds to "a peripheral region detection portion" of the present disclosure. The central region detection portion 103 corresponds to "a central region detection portion" of the present disclosure. Further, the storage portion 104 of the present embodiment corresponds to "a storage portion" of the present disclosure. The prediction portion 105 corresponds to "a prediction portion" of the present disclosure.

Figure 3:
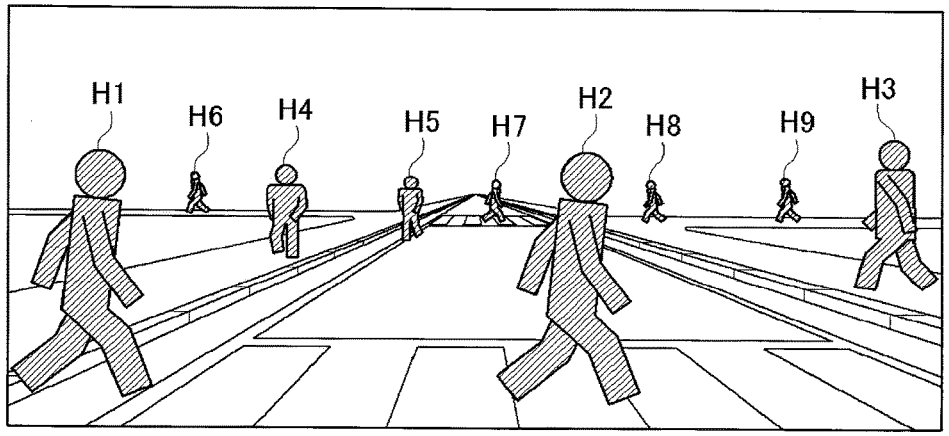
FIG. 3 is a diagram exemplifying an example of a photographic image captured by an onboard camera.

FIG. 3 shows an example of a photographic image captured by the onboard camera 10. As is shown in the drawing, pedestrians H1 through H9 of various sizes are in the photographic image at various positions. In the example of FIG. 3, only pedestrians are captured as moving objects. It should be appreciated that the moving object is not limited to a pedestrian and may also be an automobile or a two wheels.

According to a method of detecting a moving object in a photographic image, templates representing characteristic figures of moving objects are pre-stored and portions matching the templates are extracted from the photographic image by pattern matching. For example, a pedestrian H4 can be detected by moving an applied position of a pedestrian template TP indicated by a broken rectangle of FIG. 4 little by little in the photographic image and finding a portion that matches a characteristic of the template TP. The pedestrians H1 through H3 which are larger than the template TP cannot be detected with the template TP. The pedestrians H5 through H9 too small for the template TP cannot be detected with the template TP. It is necessary to search for the pedestrians H1 through H3 and the pedestrians H5 through H9 in the same manner as above by using templates TPs of different sizes.

Figure 5:
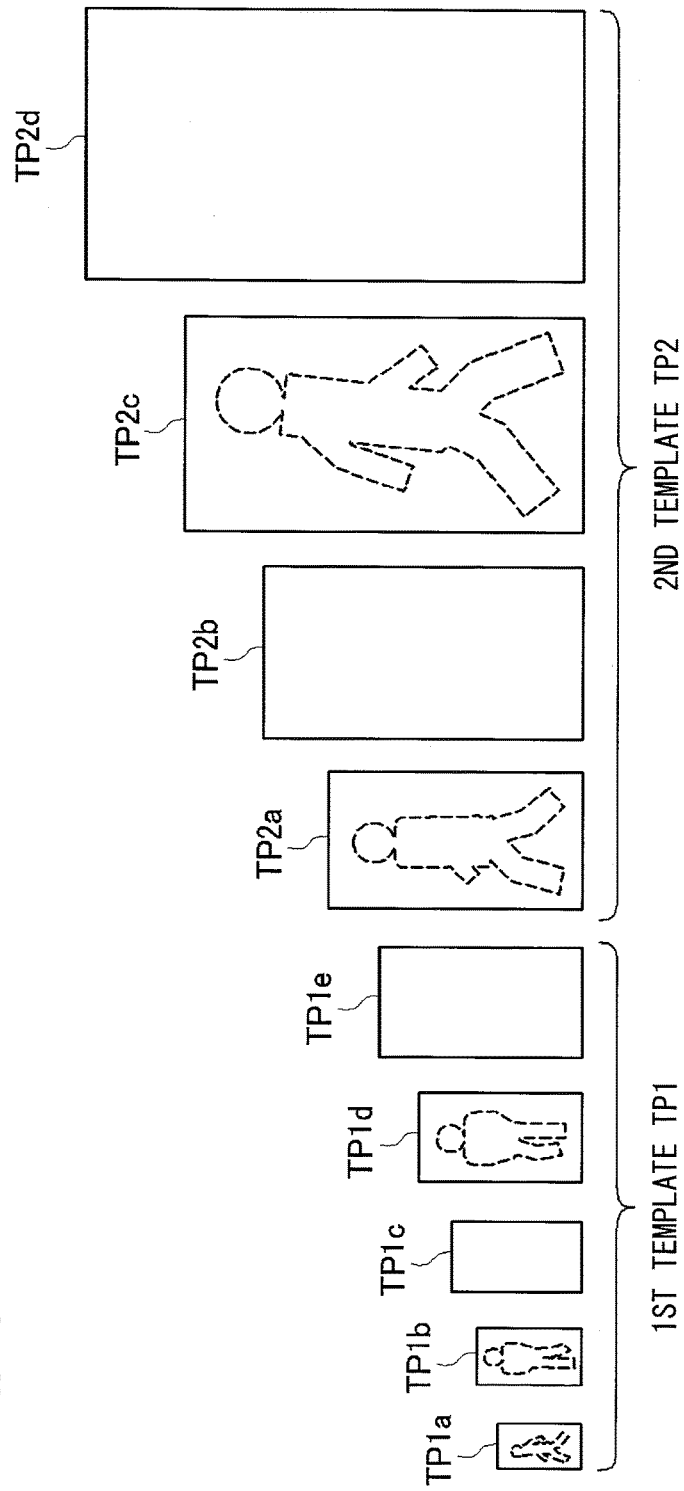
FIG. 5 is a diagram exemplifying an example of multiple templates used to detect a pedestrian.

FIG. 5 shows examples of multiple templates TPs used to detect pedestrians. In the present embodiment, nine types of templates TPs including small templates TPs and large templates TPs are stored in advance. Five small templates TPs are referred to as "the first template TP1" and four large templates TPs are referred to as "the second template TP2" for convenience. The five templates TPs included in the first template TP1 are discriminated one from another and the smallest template TP is referred to as TP1a, sequentially followed by TP1b, TP1c, TP1d, and TP1e. Likewise, the four templates TPs included in the second template TP2 are discriminated one from another and the smallest template TP is referred to as TP2a, sequentially followed by TP2b, TP2c, and TP2d.

In the present embodiment, a small pedestrian detectable by the first template TP1 corresponds to "a first moving object" of the present disclosure. A large pedestrian detectable by the second template TP2 corresponds to "a second moving object" of the present disclosure.

In the present embodiment, each of the first template TP1 and the second template TP2 includes multiple templates TPs. It should be appreciated that each of the first template TP1 and the second template TP2 does not necessarily include multiple templates TPs. For example, either the first template TP1 or the second template TP2 may include only one template TP.

In the present embodiment, the nine templates TPs are largely divided to two types of templates, the first template TP1 and the second template TP2. It should be appreciated that the nine templates TPs may be divided to three or more types of templates.

Figure 4:
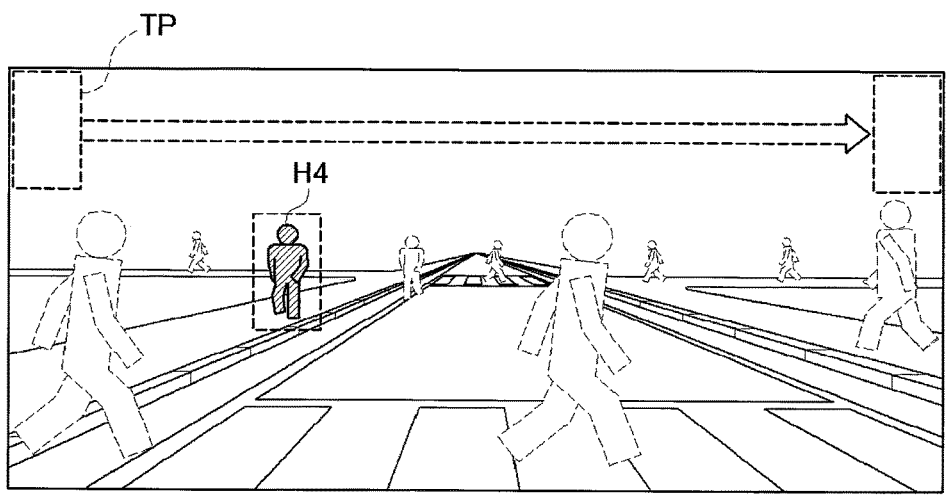
FIG. 4 is a diagram illustrating a situation in which a pedestrian in the photographic image is detected with a template.

Each and every one of the pedestrians H1 through H9 of FIG. 3 can be detected without being overlooked by searching the photographic image using all the templates TPs shown in FIG. 5. When the photographic image is thoroughly searched using all the templates TPs in the manner as shown in FIG. 4, it may take too long and make it difficult to detect a moving object quickly. Thus, the moving object detection apparatus 100 of the present embodiment detects a moving object using the method as follows.

(Moving Object Detection Processing of First Embodiment)

Figure 6:
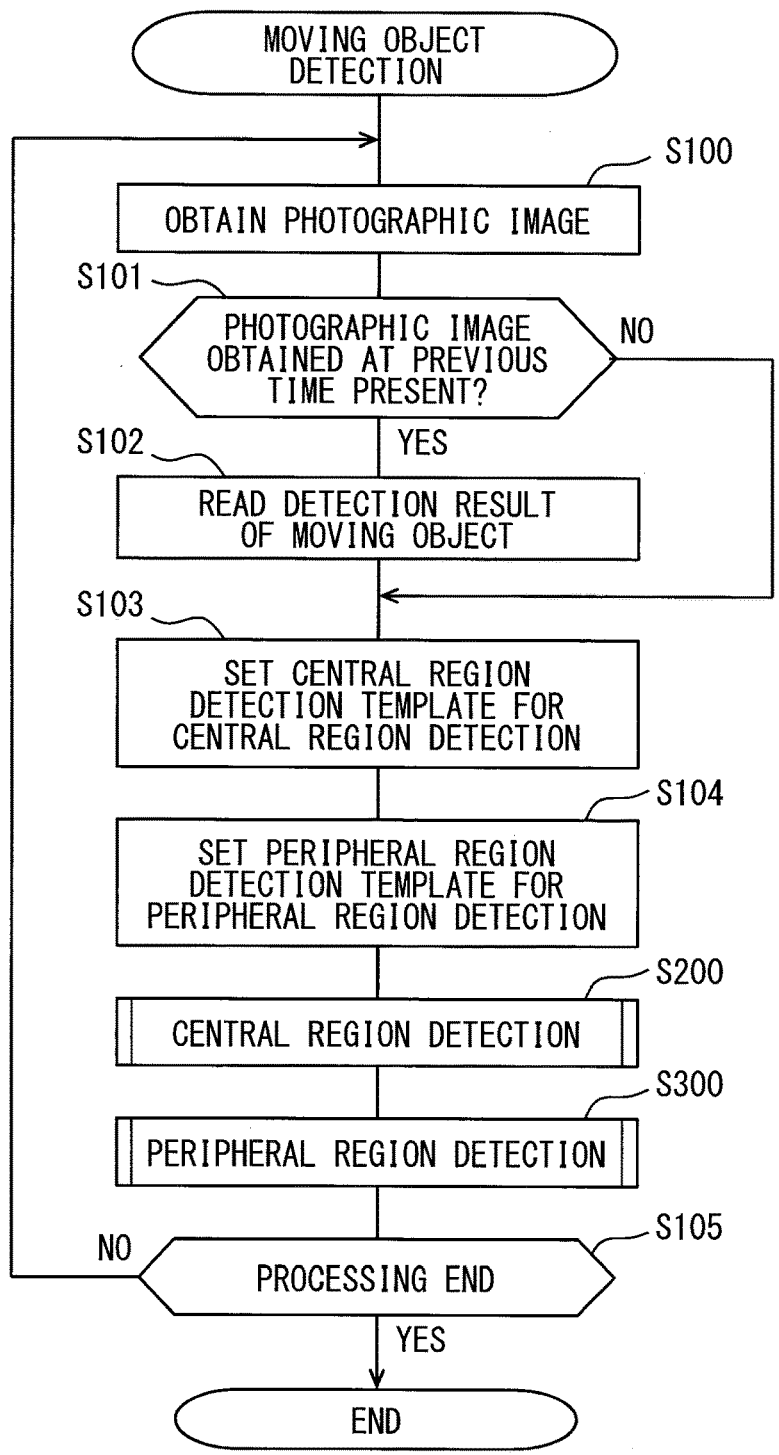
FIG. 6 is a flowchart illustrating a moving object detection processing of the first embodiment.

FIG. 6 shows a flowchart of a moving object detection processing performed by the moving object detection apparatus 100 of the first embodiment when detecting a moving object in a photographic image.

In the moving object detection processing, the moving object detection apparatus 100 initially obtains a photographic image from the onboard camera 10 (S100). Subsequently, the moving object detection apparatus 100 determines whether a photographic image obtained at a previous time exists or not (S101). The imaging portion 101 obtains a photographic image from the onboard camera 10 at a constant frequency. Hence, the moving object detection apparatus 100 normally determines that a photographic image obtained at the previous time exists (S101: yes). By contrast, the moving object detection apparatus 100 determines that a photographic image obtained at a previous time is absent immediately after power is supplied to the onboard camera 10 or the moving object detection apparatus 100 (S101: no).

The onboard camera 10 does not necessarily capture photographic images in series and may capture multiple photographic images by a single-shot at a predetermined time interval. In this case, the moving object detection apparatus 100 may determine that a photographic image obtained at a previous time is absent (S101: no) when the predetermined time interval (or a predetermined reference time longer than the predetermined time) has elapsed after an image has been captured in the previous time.

When the moving object detection apparatus 100 determines that a photographic image obtained at a previous time exists (S101:yes), the moving object detection apparatus 100 reads out a detection result of a moving object in the photographic image obtained at a previous time from the storage portion 104 (S102). The moving object detection apparatus 100 subsequently sets a central region detection template for the photographic image obtained this time according to the detection result of the photographic image obtained at a previous time (S103). The moving object detection apparatus 100 divides a photographic image to "the peripheral region" and "the central region", and detects a moving object in each region. The central region detection template represents a template used to detect a moving object in the central region of the photographic image.

When the moving object detection apparatus 100 determines that a photographic image obtained at a previous time does not exist, that is, absent (S101: no), the moving object detection apparatus 100 sets the central region detection template for the photographic image obtained this time without reading out a detection result of a photographic image obtained at a previous time (S103).

Figure 7A:
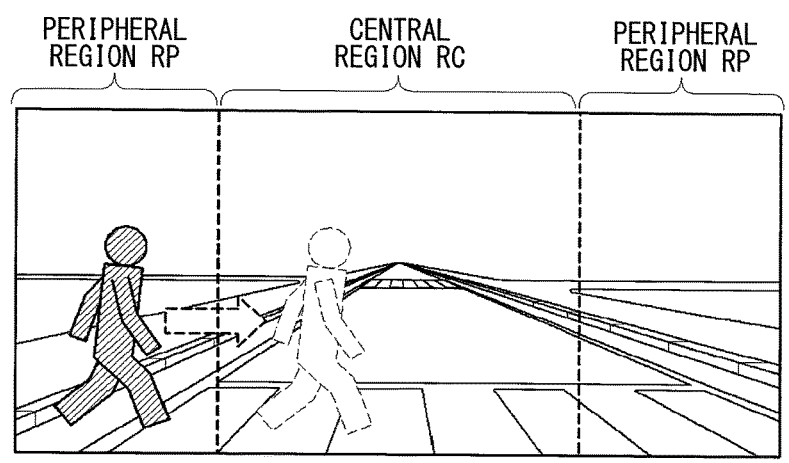
FIG. 7A is a diagram illustrating a fundamental idea based on which a central region detection template is set according to a detection result of a photographic image obtained at the previous time.
Figure 7B:
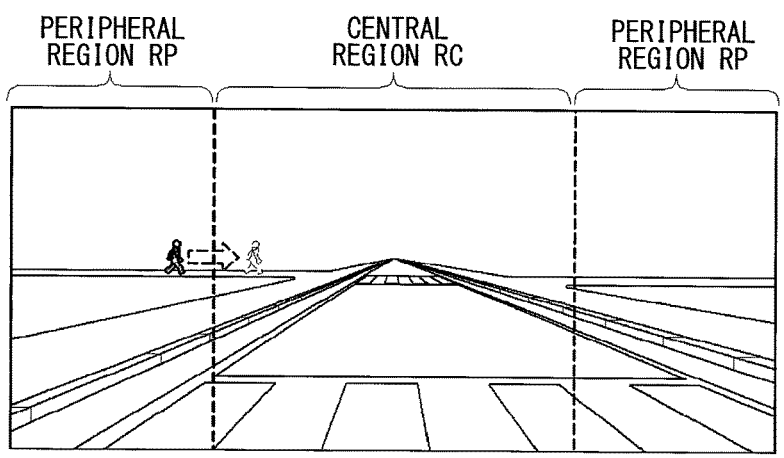
FIG. 7B is a diagram illustrating another fundamental idea based on which the central region detection template is set according to a detection result of the photographic image obtained at the previous time.
Figure 7C:
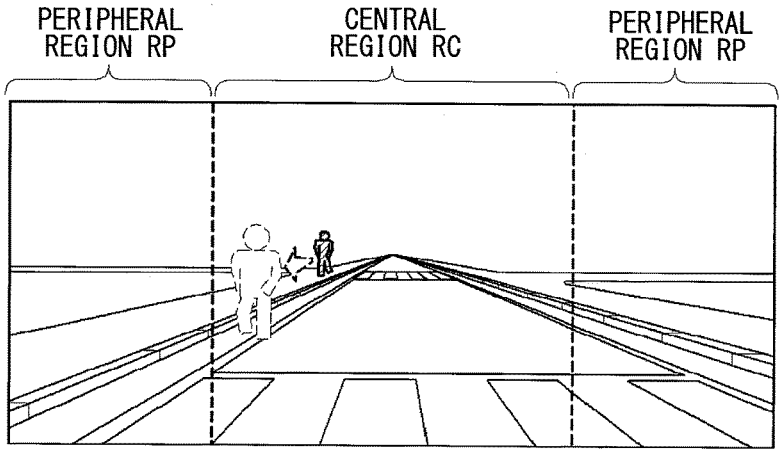
FIG. 7C is a diagram illustrating another fundamental idea based on which the central region detection template is set according to a detection result of the photographic image obtained at the previous time.

FIG. 7A through FIG. 7C show a fundamental idea which sets the central region detection templates, based on a detection result of the photographic image obtained at a previous time.

It is supposed that, as are shown in FIG. 7A through FIG. 7C, a photographic image is divided to peripheral regions RPs provided on both of the right and left sides and a central region RC provided at the center. A large pedestrian taken in the peripheral region RP shaded in FIG. 7A is likely to move over to the central region RC as indicated by a broken arrow. By contrast, it is less likely that a large pedestrian who has never been in the peripheral region RP suddenly appears in the central region RC. It is considered necessary to set templates (the second template TP2) used to detect a large pedestrian as the central region detection templates only after a large pedestrian is detected in the peripheral region RP.

As exemplified in FIG. 7B, when a small pedestrian is in the peripheral region RP, the pedestrian is likely to move over to the central region RC. When a small pedestrian is detected in the peripheral region RP, it is considered necessary to set templates (the first template TP1) used to detect a small pedestrian as the central region detection templates.

A pedestrian taken in the central region RC is likely to come closer and appear larger in a photographic image obtained next. As shown in FIG. 7C, when a small pedestrian shaded in FIG. 7C is detected in the central region RC, it is considered necessary to set not only the first template TP1 used to detect a small pedestrian but also the second template TP2 used to detect a large pedestrian as the central region detection templates.

A pedestrian in the central region RC who is too far and too small to be detected may come close enough to appear in a detectable size in a photographic image obtained next. Even when a small pedestrian is detected neither in the central region RC nor in the peripheral regions RPs, it is considered necessary to set the first template TP1 used to detect a small pedestrian as the central region detection templates.

The fundamental idea setting the central region detection templates based on a detection result of the photographic image obtained at a previous time has been explained. In S103 of the moving object detection processing of FIG. 6, the moving object detection apparatus 100 actually sets the central region detection templates by referring to a table (central region detection template) shown in FIG. 8. The table of FIG. 8 is pre-stored in the storage portion 104.

In a case where a photographic image obtained at a previous time is absent (when determination of "no" is made in S101 of FIG. 6), the moving object detection apparatus 100 sets the first template TP1 and the second template TP2 as the central region detection templates.

On the other hand, in a case where a photographic image obtained at a previous time exists (when determination of "yes" is made in S101 of FIG. 6), the moving object detection apparatus 100 reads out a detection result of a moving object (see S102), and sets the central region detection templates according to the result as follows.

A case where the moving object is not detected in the central region RC will be described. It is sufficient to detect a pedestrian coming closer from far in the central region RC and a pedestrian moving over from at least one of the peripheral regions RPs. When a moving object is not detected in the peripheral regions RPs, it can be considered that no pedestrian moves over from the peripheral region RP. The moving object detection apparatus 100 may set the first template TP1 as the central region detection templates.

When a first moving object (in this case, a small pedestrian) is detected in at least one of the peripheral regions RPs, it is sufficient to detect a pedestrian coming closer from far in the central region RC and a small pedestrian moving over from at least one of the peripheral regions RPs. Hence, the moving object detection apparatus 100 may set the first template TPI as the central region detection templates.

When a second moving object (in this case, a large pedestrian) is detected in at least one of the peripheral regions RPs, it is sufficient to detect a pedestrian approaching from far in the central region RC and the large pedestrian moving over from at least one of the peripheral regions RPs. The moving object detection apparatus 100 may set the first template TPI used to detect the small pedestrian and the second template TP2 used to detect the large pedestrian as the central region detection templates.

A case where the first moving object (in this case, the small pedestrian) is detected in the central region RC will be described. It is sufficient to detect the small pedestrian in the central region RC, the small pedestrian coming closer from far and eventually appearing in the central region RC, and a pedestrian moving over from at least one of the peripheral regions RPs. When a moving object is not detected in either of the peripheral regions RPs, it can be considered that no pedestrian moves over from either peripheral region RP. The moving object detection apparatus 100 may set the first template TPI as the central region detection templates.

It should be noted that in a case where a small pedestrian in the central region RC is a relatively large pedestrian detectable with the template TP1*d* or the template TP1*e*, the pedestrian may possibly come close enough to appear as a large pedestrian detectable with the template TP2*a*. By taking such an occasion into consideration, when a small pedestrian detected in the central region RC is detected with the template TP1*d* or the template TP1*e*, the moving object detection apparatus 100 also sets the small template TP2*a* in the second template TP2 as the central region detection template just in case, which is indicated by (TP2*a*) in FIG. 8.

When a small pedestrian is detected in the central region RC and a first moving object (the small pedestrian) is also detected in at least one of the peripheral regions RPs, the moving object detection apparatus 100 may set the first template TP1 as the central region detection templates.

It should be appreciated that when a small pedestrian in the central region RC is detected with the template TP1*d* or the template TP1*e*, the moving object detection apparatus 100 also sets the template TP2*a* in the second template TP2 as the central region detection template.

When a small pedestrian is detected in the central region RC and a second moving object (the large pedestrian) is also detected in at least one of the peripheral regions RPs, it is sufficient to detect a small pedestrian in the central region RC and the large pedestrian moving over from the peripheral region RP. The moving object detection apparatus 100 may set the first template TPI used to detect a small pedestrian and the second template TP2 used to detect a large pedestrian as the central region detection templates.

A case where a second moving object (the large pedestrian) is detected in the central region RC will be described. It is sufficient to detect a large pedestrian in the central region RC, a small pedestrian coming closer from far and eventually appearing in the central region RC, and a pedestrian moving over from at least one of the peripheral regions RPs. The moving object detection apparatus 100 may set the first template TPI used to detect a small pedestrian and the second template TP2 used to detect a large pedestrian as the central region detection templates independently of a detection result of the moving object in the peripheral region RP.

The moving object detection apparatus 100 sets the central region detection templates in S103 of the moving object detection processing shown in FIG. 6. After the moving object detection apparatus 100 sets the central region detection templates, the moving object detection apparatus 100 subsequently sets the peripheral region detection templates (S104).

The peripheral regions RPs abuts on a blind spot of the onboard camera 10. It may be probable that a large pedestrian or a small pedestrian suddenly appears from the blind spot. It is also likely that a pedestrian coming closer from far is in either one of the peripheral regions RPs on a small scale.

As exemplified in a table (a peripheral region detection template) shown in FIG. 9, the moving object detection apparatus 100 always sets the first template TP1 and the second template TP2 as the peripheral region detection templates independently of a detection result of the photographic image obtained at a previous time. As similar with the table of FIG. 8, the table of FIG. 9 is also stored in the storage portion 104 in advance.

After the moving object detection apparatus 100 sets the central region detection templates and the peripheral region detection templates (S103 and S104 of FIG. 6, respectively), the moving object detection apparatus 100 starts processing (a central region detection processing in S200) to detect a moving object in the central region RC and subsequently starts processing (a peripheral region detection processing in S300) to detect a moving object in the peripheral regions RPs.

(Central Region Detection Processing)

Figure 10:
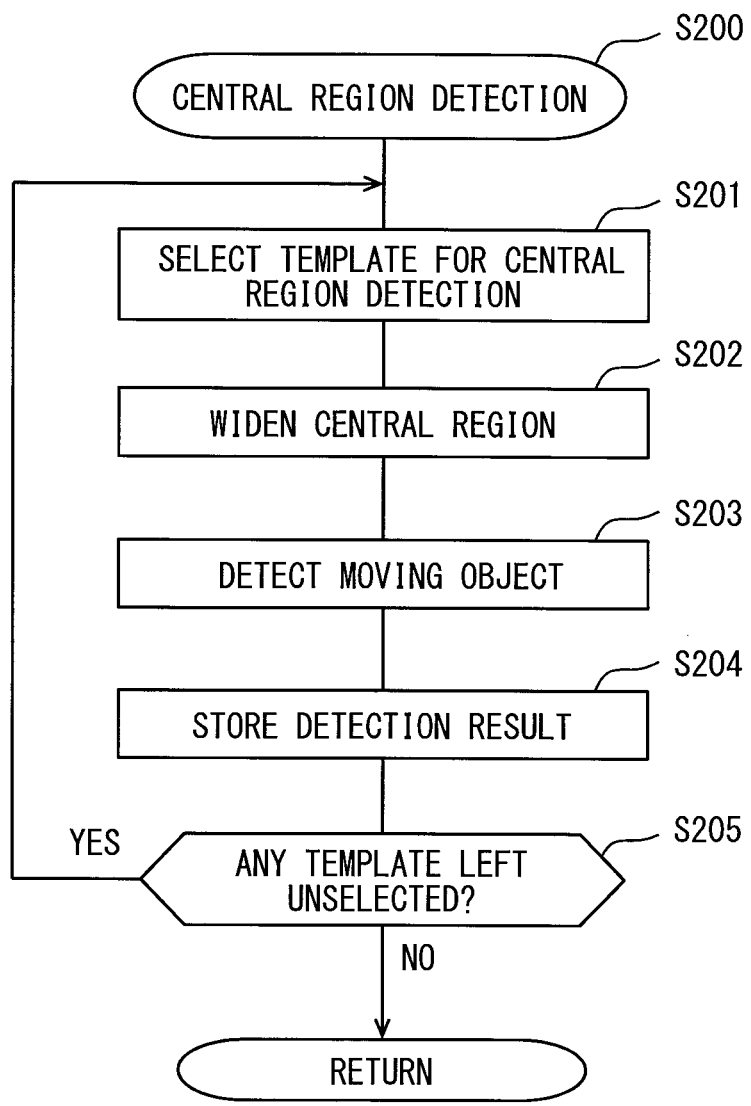
FIG. 10 is a flowchart illustrating a central region detection processing.

FIG. 10 shows a flowchart of the central region detection processing. When the central region detection processing (S200) begins, the moving object detection apparatus 100 initially selects one template from the templates set for central region detection (S201).

Subsequently, the moving object detection apparatus 100 widens the central region RC of the photographic image by a width of the selected template (S202), which is the processing as follows.

Figure 11A:
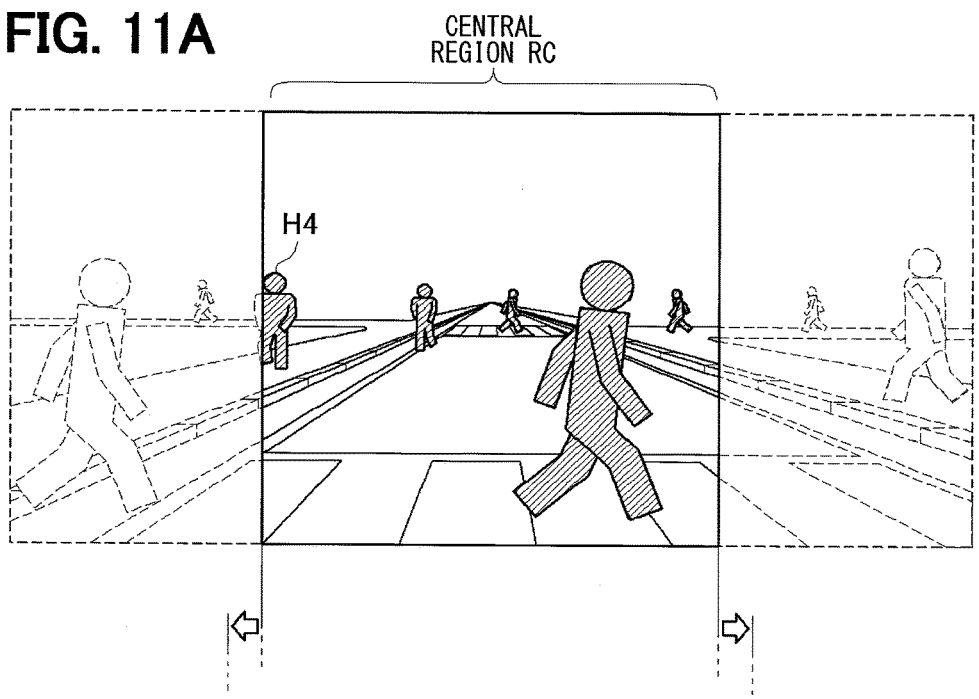
FIG. 11A is a diagram exemplifying a situation in which a central region in the photographic image is widened.
Figure 11B:
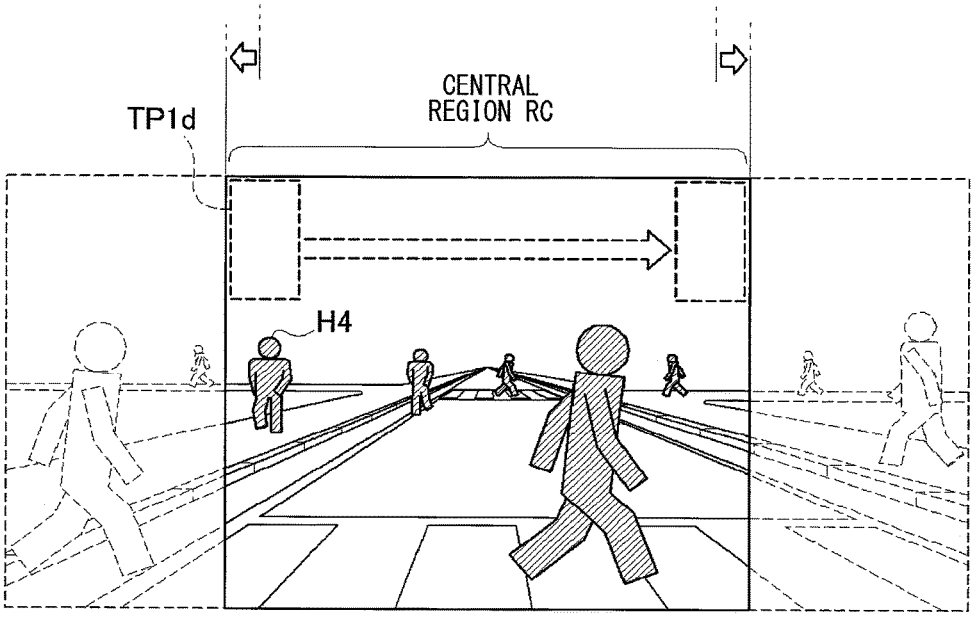
FIG. 11B is a diagram exemplifying a situation in which the central region in the photographic image is widened.

FIG. 11A and FIG. 11B exemplify a manner in which the central region RC of the photographic image is widened. FIG. 11A shows a state before the central region RC is widened and FIG. 11B shows a state after the central region RC is widened. Hollow arrows in FIG. 11A and FIG. 11B indicate widening of the central region RC.

As is shown in FIG. 11A, when the central region RC is set in the photographic image, a boundary of the central region RC may fall on a moving object to be detected in some cases. In the example shown in FIG. 11A, the boundary of the central region RC falls on the pedestrian H4 alone. The boundary of the central region RC may possibly fall on every pedestrian of any size to be detected. Even when the moving object detection apparatus 100 searches the central region RC with the templates, the moving object detection apparatus 100 may fail to detect the pedestrian on the boundary.

The moving object detection apparatus 100 widens the central region RC by moving the boundary for the pedestrian on the boundary to be in the central region RC before starting a search for a moving object in the central region RC. Regarding an amount of movement of the boundary, the boundary on each of the right and left sides is moved outward by an amount comparable to half the width of the template used for the search. That is, although pedestrians of various sizes may be present on the boundary, only a pedestrian of a size corresponding to the template is detectable. Hence, it is sufficient to move the boundary outward by about half the width of the template.

In the example shown in FIG. 11B, the template TP1*d* is selected and both of the right and left boundaries are moved outward by an amount comparable to half the width of the template TP1*d*. Consequently, the central region RC is widened by an amount comparable to the width of the template TP1*d*.

After the moving object detection apparatus 100 widens the central region RC by the width of the selected template, the moving object detection apparatus 100 detects a moving object in the widened central region RC by moving a position of the template little by little in the widened central region RC (S203 of FIG. 10). After the moving object detection apparatus 100 searches the entire widened central region RC, the moving object detection apparatus 100 stores a detection result into the storage portion 104 (S204). A position at which a moving object is detected and the template with which the moving object is detected (the template TP1*d* in the example shown in FIG. 11B) are stored as the detection result. When the template with which the moving object is detected is given, it may be possible to recognize a size of the moving object roughly.

Subsequently, the moving object detection apparatus 100 determines whether any of the central region detection templates is left unselected (S205). When at least one template is left unselected (S205: yes), the moving object detection apparatus 100 returns to the beginning of the processing and selects one new template (S201) to start a series of the processing steps (S202 through S205).

When the moving object detection apparatus 100 determines that no template is left unselected after a repetition of the processing as above (S205: no), the moving object detection apparatus 100 ends the central region detection processing (S200) of FIG. 10 and returns to the moving object detection processing of FIG. 6. When the moving object detection apparatus 100 returns to the moving object detection processing from the central region detection processing (S200), the moving object detection apparatus 100 subsequently starts the peripheral region detection processing (S300).

(Peripheral Region Detection Processing)

Figure 12:
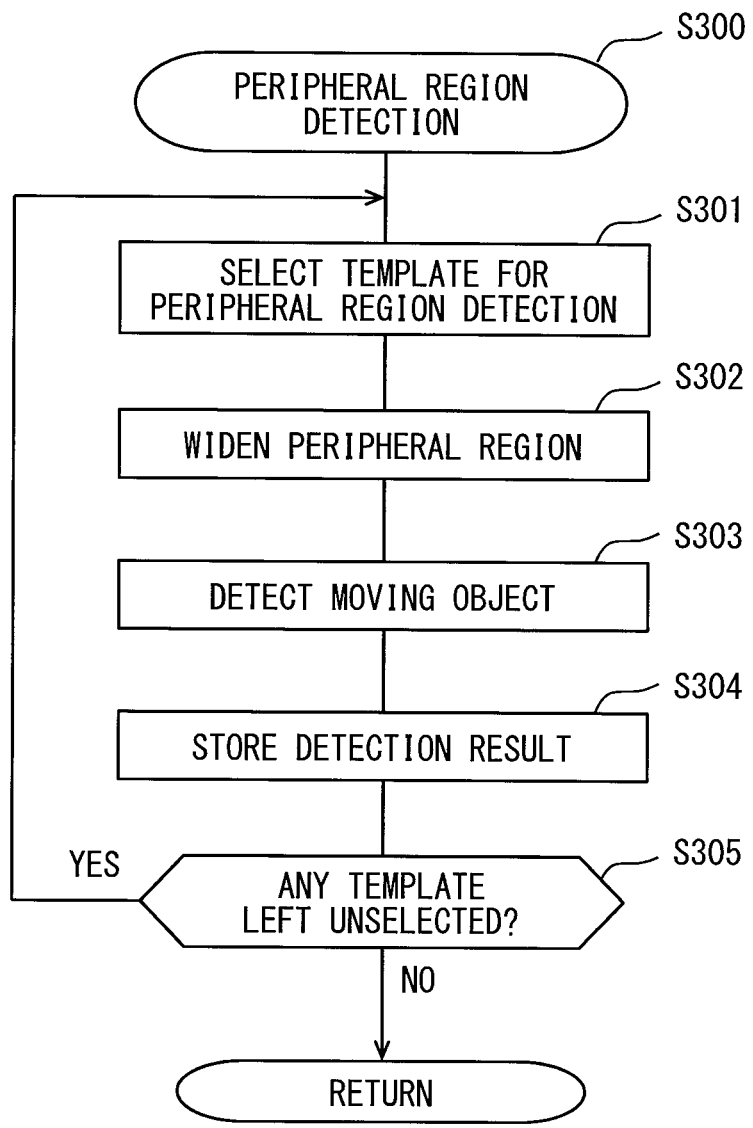
FIG. 12 is a flowchart illustrating the peripheral region detection processing.

FIG. 12 shows a flowchart of the peripheral region detection processing. In the case of the peripheral region detection processing (S300), when the processing begins, the moving object detection apparatus 100 initially selects one template from the templates set for the peripheral area detection (S301).

Subsequently, the peripheral regions RPs of the photographic image are widened by a width of the selected template (S302).

Figure 13A:
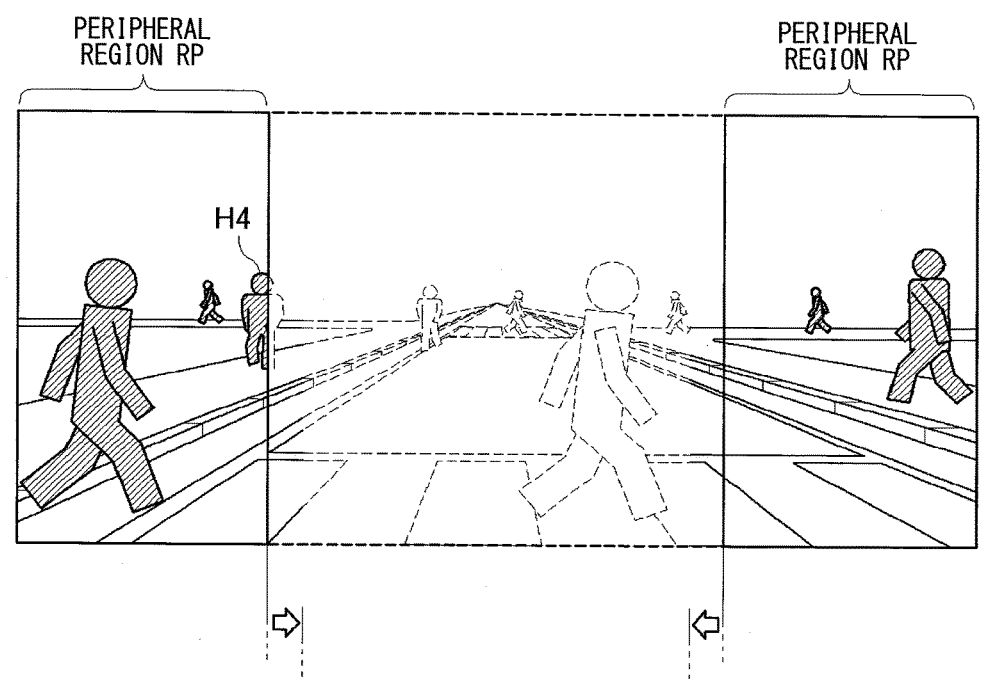
FIG. 13A is a diagram exemplifying a situation in which the peripheral region in the photographic image is widened.
Figure 13B:
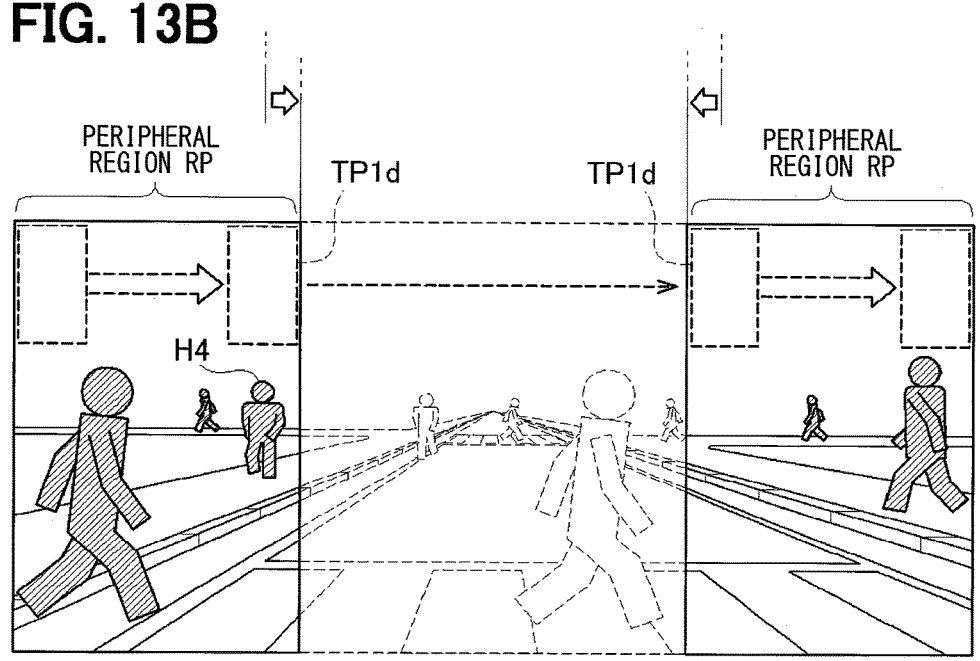
FIG. 13B is a diagram exemplifying a situation in which the peripheral region in the photographic image is widened.

FIG. 13A and FIG. 13B exemplify a manner in which the peripheral regions RPs of the photographic image are widened. FIG. 13A shows a state before the peripheral regions RPs are widened and FIG. 13B shows a state after the peripheral regions RPs are widened. Hollow arrows in FIG. 13A and FIG. 13B indicate widening of the peripheral regions RPs.

In a case where the peripheral regions RPs are set in the photographic image, as similar to the case where the central region RC is set, the boundary of the peripheral region RP may also fall on a moving object in the photographic image in some cases (see FIG. 13A). Even when the moving object detection apparatus 100 searches the peripheral regions RPs with the templates, the moving object detection apparatus 100 may possibly fail to detect a pedestrian on the boundary.

The moving object detection apparatus 100 moves the boundary for the pedestrian on the boundary to be in the peripheral region RP before starting a search for a moving object in the peripheral regions RPs. More specifically, the boundary between the peripheral region RP on the left side of the photographic image and the central region RC is moved rightward, and the boundary between the peripheral region RP on the right side of the photographic image and the central region RC is moved leftward. Regarding an amount of movement of the boundary, as similar to the case where the boundary of the central region RC is moved, it is sufficient to move the boundary by an amount comparable to half the width of the template used for the search.

In the example shown in FIG. 13B, the template TP1*d* is selected. Hence, the boundary of the peripheral region RP on the left of the photographic image is moved rightward by an amount comparable to half the width of the template TP1*d* and the boundary of the peripheral region RP on the right of the photographic image is moved leftward by an amount comparable to half the width of the template TP1*d*. Consequently, the peripheral regions RPs are also widened by an amount comparable to the width of the template TP1*d*.

After the moving object detection apparatus 100 widens the peripheral regions RPs by an amount comparable to the width of the selected template, the moving object detection apparatus 100 detects a moving object in the widened peripheral regions RPs by moving a position of the template little by little in the widened peripheral regions RPs (S303 of FIG. 12). The central region RC exists between the right and left peripheral regions RPs. Since moving objects in the central region RC are already detected in the central region detection processing (S200), detection in the central region RC can be skipped (referring to FIG. 13B).

After the moving object detection apparatus 100 searches the entire widened peripheral regions RPs, the moving object detection apparatus 100 stores a detection result into the storage portion 104 (S304). In the peripheral region detection processing (S300), as with the central region detection processing (S200), a position at which a moving object is detected and the template with which the moving object is detected (hence, the size of the moving object) are stored as the detection result.

Subsequently, the moving object detection apparatus 100 determines whether any of the peripheral region detection templates is left unselected (S305). When at least one template is left unselected (S305: yes), the moving object detection apparatus 100 returns to the beginning of the processing and selects one new template (S301), and then starts a series of the processing steps (S302 through S305).

When the moving object detection apparatus 100 determines that no template is left unselected after a repetition of the processing as above (S305: no), the moving object detection apparatus 100 ends the peripheral region detection processing (S300) of FIG. 12 and returns to the moving object detection processing of FIG. 6.

After the moving object detection apparatus 100 returns to the moving object detection processing from the peripheral region detection processing (S300), the moving object detection apparatus 100 determines whether to end the moving object detection processing (S105 of FIG. 6). When the moving object detection apparatus 100 determines that the processing (S105: no) does not terminate, the moving object detection apparatus 100 returns to the beginning of the moving object detection processing and obtains a new photographic image from the onboard camera 10 (S101) to repeat a series of the processing steps.

By contrast, when the moving object detection apparatus 100 determines to end the processing (S105: yes), the moving object detection apparatus 100 ends the moving object detection processing of the first embodiment shown in FIG. 6.

The moving object detection apparatus 100 of the first embodiment detects a moving object by dividing a photographic image to the central region RC and the peripheral regions RPs. The moving object detection apparatus 100 detects a moving object in the peripheral regions RPs using all the templates TPs. The moving object detection apparatus 100 detects a moving object in the central region RC using a part of the templates TPs set according to a detection result of the photographic image obtained at a previous time. It may be possible to shorten a time required to detect a moving object as compared with a case where a moving object is detected in the entire photographic image using all the templates TPs as in the related art.

Templates TPs with which it is considered least likely that a moving object is detected in the central region RC in the photographic image obtained this time from a detection result of the photographic image obtained at a previous time are omitted from the central region detection templates TPs. It should be noted that the rest of the templates TPs are set as the central region detection templates TPs. Hence, the moving object detection apparatus 100 of the first embodiment does not overlook any moving object in the photographic image and leaving the moving object undetected.

(Moving Object Detection Processing of Second Embodiment)

The first embodiment sets the central region detection templates TPs based on a detection result of the photographic image obtained at a previous time. The central region detection templates TPs may be set in consideration of a detection result of the photographic image obtained second previous time in addition to the detection result of the photographic image obtained at a previous time. Moving object detection processing of the second embodiment will be described and a difference from the first embodiment will be described.

Figure 14:
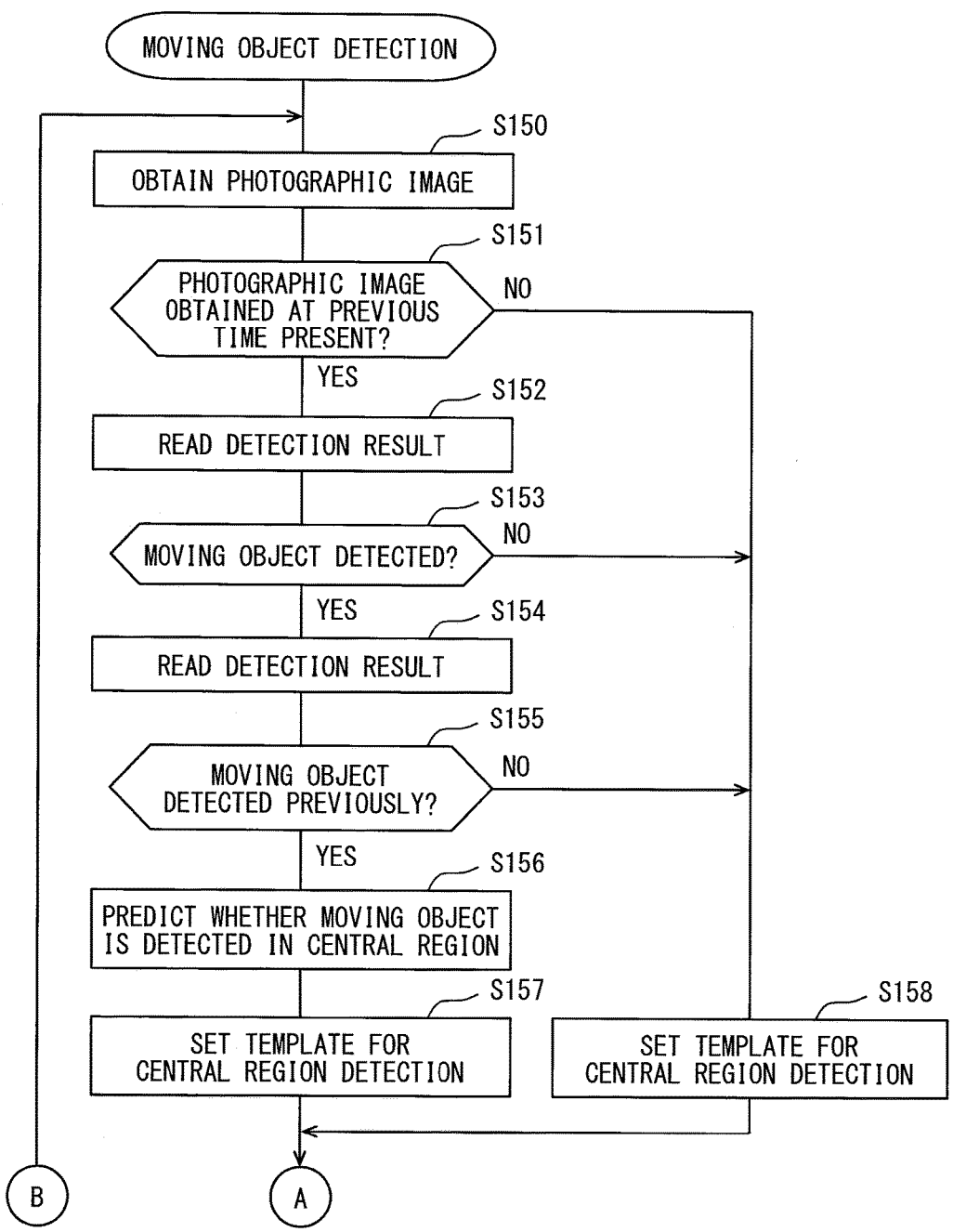
FIG. 14 is a flowchart illustrating a first half of the moving object detection processing of a second embodiment.

FIG. 14 shows a flowchart of the moving object detection processing of the second embodiment. In the moving object detection processing of the second embodiment, as with the first embodiment, the moving object detection apparatus 100 initially obtains the photographic image from the onboard camera 10 (S150) and subsequently determines whether a photographic image obtained at a previous time exists (S151).

When the moving object detection apparatus 100 determines that a photographic image obtained at a previous time exists (S151: yes), the moving object detection apparatus 100 reads out a detection result of a moving object in the photographic image obtained at a previous time from a storage portion 104 (S152) and determines whether the moving object is detected in the photographic image obtained at a previous time (S153).

When the moving object has been detected in the photographic image obtained at a previous time (S153: yes), the moving object detection apparatus 100 reads out a detection result of the photographic image obtained second previous time from the storage portion 104 (S154) and determines whether the moving object is detected in the photographic image obtained second previous time (S155). When the moving object is detected in the photographic image obtained second previous time (S155: yes), the moving object detection apparatus 100 predicts whether the moving object is detected in a central region RC (S156) by central region detection processing (S200) performed this time, based on a position at which the moving object has been detected in the photographic image obtained at a previous time and a position at which the moving object has been detected in the photographic image obtained second previous time.

Figure 16A:
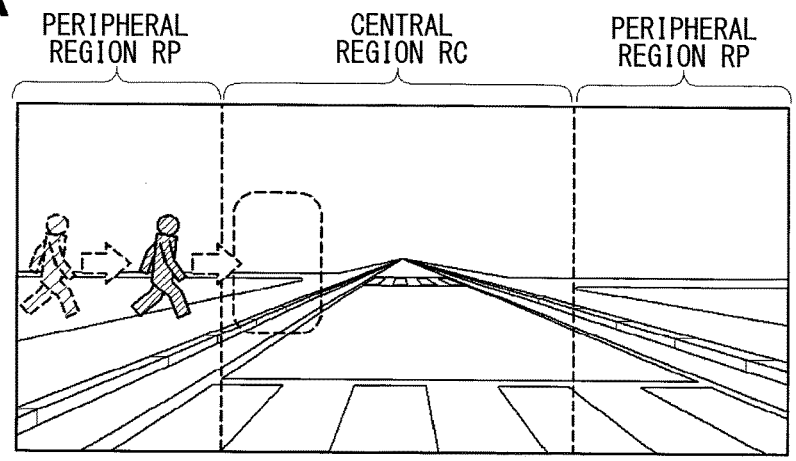
FIG. 16A is a diagram illustrating a method for predicting whether the moving object is detected in the central region during the moving object detection processing of the second embodiment.
Figure 16B:
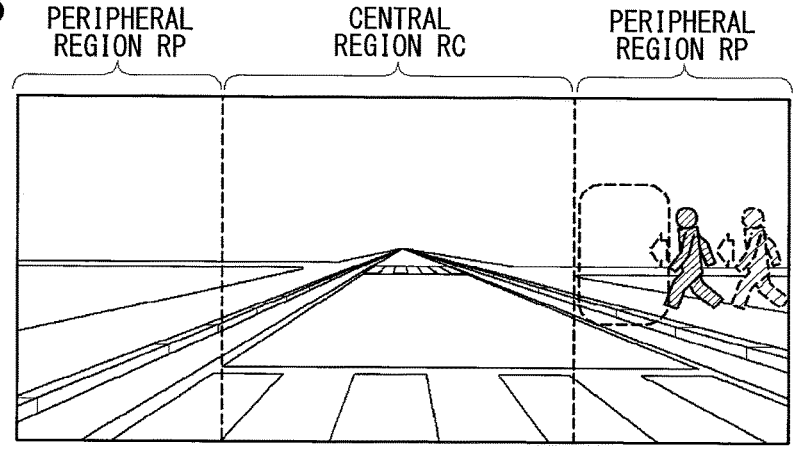
FIG. 16B is a diagram illustrating a method for predicting whether the moving object is detected in the central region during the moving object detection processing of the second embodiment.
Figure 16C:
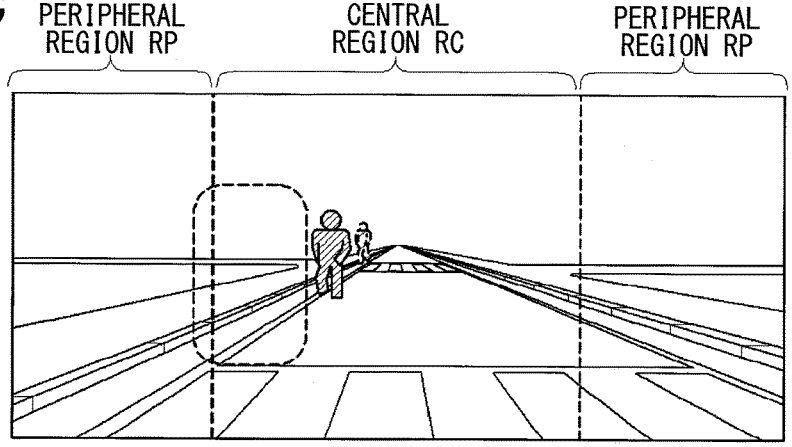
FIG. 16C is a diagram illustrating a method for predicting whether the moving object is detected in the central region during the moving object detection processing of the second embodiment.

FIG. 16A through FIG. 16C show a manner in which the moving object detection apparatus 100 predicts whether a moving object is detected in the central region RC by performing the central region detection processing (S200) for the photographic image obtained this time based on the detection results of the moving object in the photographic image obtained at a previous time and the photographic image obtained second previous time.

In the example shown in FIG. 16A, a densely-shaded pedestrian is a pedestrian detected in the photographic image obtained at a previous time and a lightly-shaded pedestrian is a pedestrian detected in the photographic image obtained second previous time. The onboard camera 10 captures an image at a predetermined time interval. Hence, when a position of the pedestrian detected in the photographic image obtained second previous time and a position of the pedestrian detected in the photographic image obtained at a previous time are given, it may be possible to predict a rough range within which the pedestrian is expected to be detected in the photographic image obtained this time.

A range encircled by a thick broken line in FIG. 16A indicates a prediction range obtained as above. From the viewpoint of preventing a moving object from being overlooked and left undetected, it may be preferable to set a range slightly larger than is necessary as the prediction range within which the moving object is expected to be detected. In the example shown in FIG. 16A, the prediction range is in the central region RC. In this case, it may be possible to predict that the moving object is detected in the central region RC.

In the example shown in FIG. 16B, a position at which the pedestrian (being displayed with the lightly shading) is detected in the photographic image obtained second previous time is not away from a position at which the pedestrian (being displayed with the densely shading) is detected in the photographic image obtained at a previous time. Hence, a rough prediction range within which the pedestrian is expected to be detected in the photographic image obtained this time is a range encircled by a thick broken line in FIG. 16B. Since the prediction range does not exist within the central region RC, it may be possible to predict that the moving object is not detected in the central region RC.

Both of the two examples are a case where a pedestrian is detected in a peripheral region RP. It should be appreciated that even when a pedestrian is detected in the central region RC, the moving object detection apparatus 100 is capable of predicting whether the pedestrian is detected in the central region RC in the same manner as above.

More specifically, as is shown in FIG. 16C as an example, it may be possible to predict the prediction range encircled by a thick broken line, based on a position at which the pedestrian (being displayed with the lightly shading) is detected in the photographic image obtained second previous time and a position at which the pedestrian (being displayed with the densely shading) is detected in the photographic image obtained at a previous time. A part of the prediction range is also in the central region RC. It may be possible to predict that the pedestrian is detected in the central region RC in the photographic image obtained this time.

In S156 of FIG. 14, the moving object detection apparatus 100 predicts whether the moving object is detected in the central region RC.

The moving object detection apparatus 100 subsequently sets central region detection templates TPs according to a prediction result obtained as above (S157). More specifically, when a moving object is detected in the photographic images obtained at a previous time and second previous time, the moving object detection apparatus 100 predicts whether the same moving object is detected in the central region RC. When the moving object detection apparatus 100 predicts that the moving object is detected in the central region RC, the moving object detection apparatus 100 sets a template TP for the moving object as the central region detection template TP. When the moving object detection apparatus 100 predicts that the moving object is not detected in the central region RC, the moving object detection apparatus 100 does not set a template TP for the moving object as the central region detection template TP.

When the moving object detection apparatus 100 does not predict that the moving object is detected in S156, it may be probable that a moving object too small to be detected in the photographic image comes closer and suddenly appears in the central region RC. Thus, the moving object detection apparatus 100 sets a template TP1a and a template TP1b (or a first template TP1) as the central region detection templates TPs in S157 independently of the prediction result in S156.

When a template TP for a moving object is set, it may be preferable to set not only the template TP with which the moving object is detected, but also a template TP which is adjacent to the template, that is, a template one size larger and smaller. For example, in a case where a moving object is detected with a template TP1c (referring to FIG. 5), it may be preferable to set the template TP1b and a template TP1d as the central region detection templates TPs.

Alternatively, as in the first embodiment, when a moving object is detected with the first template TP1, the first template TP1 may be set as the central region detection templates TPs. Conversely, when a moving object is detected with the second template TP2, the second template TP2 may be set as the central region detection templates TPs.

The processing to set the central region detection templates TPs when a moving object detected in the photographic image obtained at a previous time is detected in the photographic image obtained second previous time (when a determination of "yes" is made in S155) is explained.

By contrast, the moving object detection apparatus 100 is not capable of prediction in a case where a photographic image obtained at a previous time does not exist (S151: no), where a moving object is not detected in the photographic image obtained at a previous time (S153: no), or where a moving object detected in the photographic image obtained at a previous time is not detected in the photographic image obtained second previous time (S155: no). In this case, the moving object detection apparatus 100 sets the central region detection templates TPs by referring to the table shown in FIG. 8 as an example (S158) in the same manner as in the moving object detection processing of the first embodiment.

After the moving object detection apparatus 100 sets the central region detection templates TPs, the moving object detection apparatus 100 subsequently sets peripheral region detection templates TPs (S159 of FIG. 15). The moving object detection apparatus 100 sets the peripheral region detection templates TPs by referring to the table shown in FIG. 9 in the same manner as in the first embodiment. Consequently, the first template TP1 and the second template TP2 are always set as the peripheral region detection templates TPs in the second embodiment.

After the moving object detection apparatus 100 sets the central region detection templates and the peripheral region detection templates, the moving object detection apparatus 100 detects a moving object in the central region RC by starting the central region detection processing (S200), and subsequently detects a moving object in the peripheral regions RPs by starting peripheral region detection processing (S300). The central region detection processing (S200) and the peripheral region detection processing (S300) are same as the processing in the first embodiment and explanation will be omitted.

When the moving object detection apparatus 100 ends the peripheral region detection processing (S300), the moving object detection apparatus 100 determines whether to end the moving object detection processing of the second embodiment (S160). When the moving object detection apparatus 100 determines not to end the processing (S160: no), the moving object detection apparatus 100 returns to the beginning of the moving object detection processing and obtains a new photographic image from the onboard camera 10 (S151 of FIG. 14) to repeat a series of the processing steps.

Figure 15:
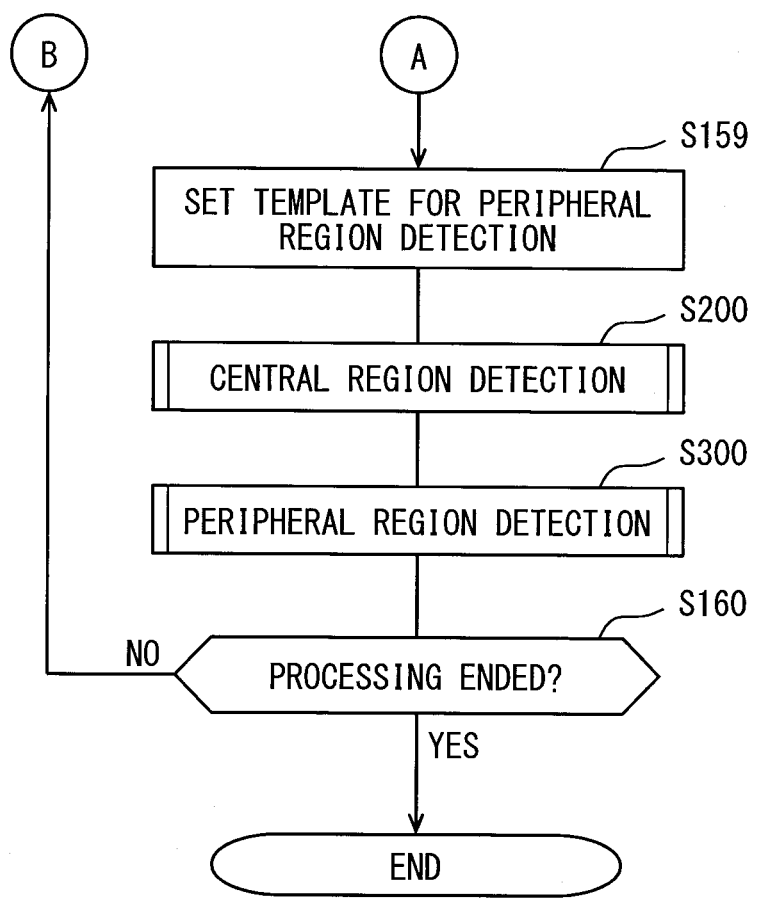
FIG. 15 is a flowchart illustrating a second half of the moving object detection processing of the second embodiment.

When the moving object detection apparatus 100 determines to end the processing (S160: yes), the moving object detection apparatus 100 ends the moving object detection processing of the second embodiment depicted in FIG. 14 and FIG. 15.

In the second embodiment, the moving object detection apparatus 100 predicts whether the moving object is detected in the central region RC of the photographic image obtained this time based on detection results of the moving object in the photographic image obtained at a previous time and in the photographic image obtained second previous time. The moving object detection apparatus 100 sets templates TPs considered necessary from a prediction result as the central region detection templates TPs. Thus, it may be possible to markedly shorten a time required to detect a moving object as compared with a case in the related art where a moving object is detected in the entire photographic image using all the templates TPs.

The moving object detection apparatus 100 sets a template TP with which the moving object is likely to be detected as the central region detection template TP. Hence, the moving object detection apparatus 100 has no possibility of overlooking any moving object in the photographic image and leaving the moving object undetected.

(Modifications)

The first embodiment and the second embodiment have more than one modification. Hereinafter, modifications will be described briefly.

(First Modification)

The first embodiment and the second embodiment above have described that the moving object detection apparatus 100 searches the central region RC thoroughly with the central region detection templates TPs and searches the peripheral regions RPs thoroughly with the peripheral region detection templates TPs. It should be noted that the moving object detection apparatus 100 does not necessarily search the central region RC or the peripheral regions RPs thoroughly.

Figure 17A:
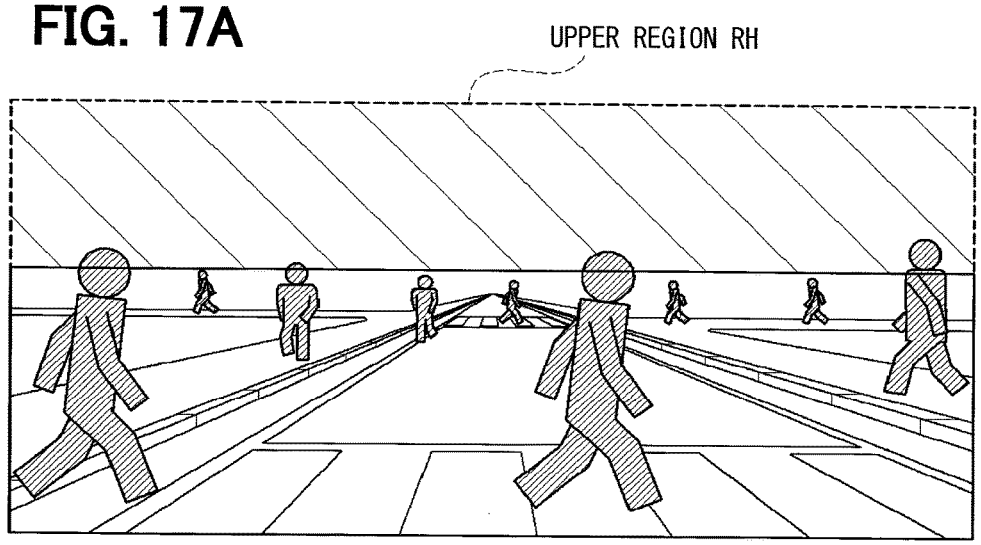
FIG. 17A is a diagram illustrating a first modification.

For example, it is least likely that a large moving object is in an upper region RH provided in an upper part of a photographic image as indicated by shading in FIG. 17A. Hence, when templates TPs (second template TP2) used to detect a large moving object are set as central region detection templates TPs or peripheral region detection templates TPs, a moving object detection apparatus 100 may skip a search in the upper region RH with the second template TP2.

Figure 17B:
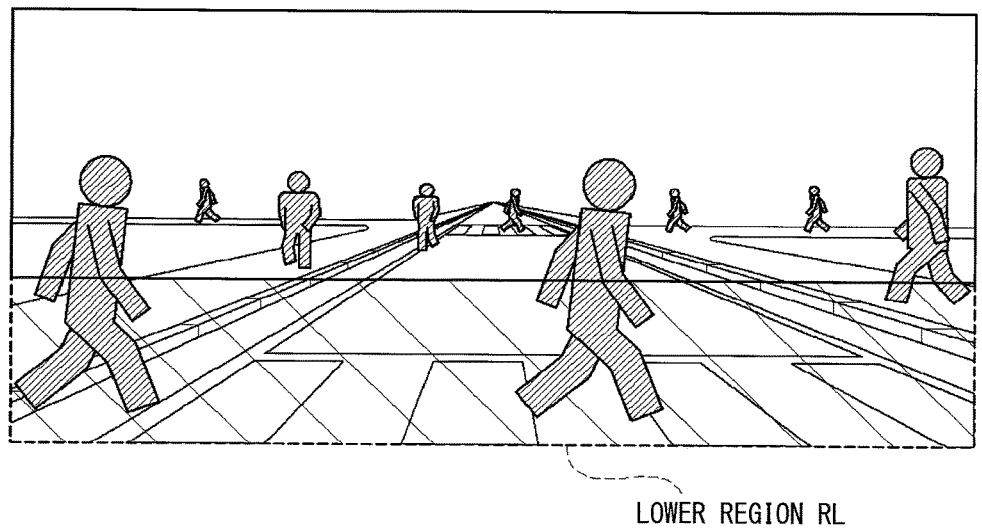
FIG. 17B is a diagram illustrating the first modification.

It is also least likely that a small moving object is in a lower region RL provided in a lower part of a photographic image as indicated by shading in FIG. 17B. Hence, when templates TPs (first template TP1) used to detect a small moving object are set as the central region detection templates TPs or the peripheral region detection templates TPs, the moving object detection apparatus 100 may skip a search in the lower region RL with the first template TP1.

According to this configuration, it may be possible to detect a moving object in a photographic image further quickly.

(Second Modification)

The first embodiment and the second embodiment above have described that photographic images are captured by the single onboard camera 10. Photographic images are not necessarily captured by the single onboard camera 10 and photographic images captured by multiple onboard cameras 10 may be combined.

Figure 18A:
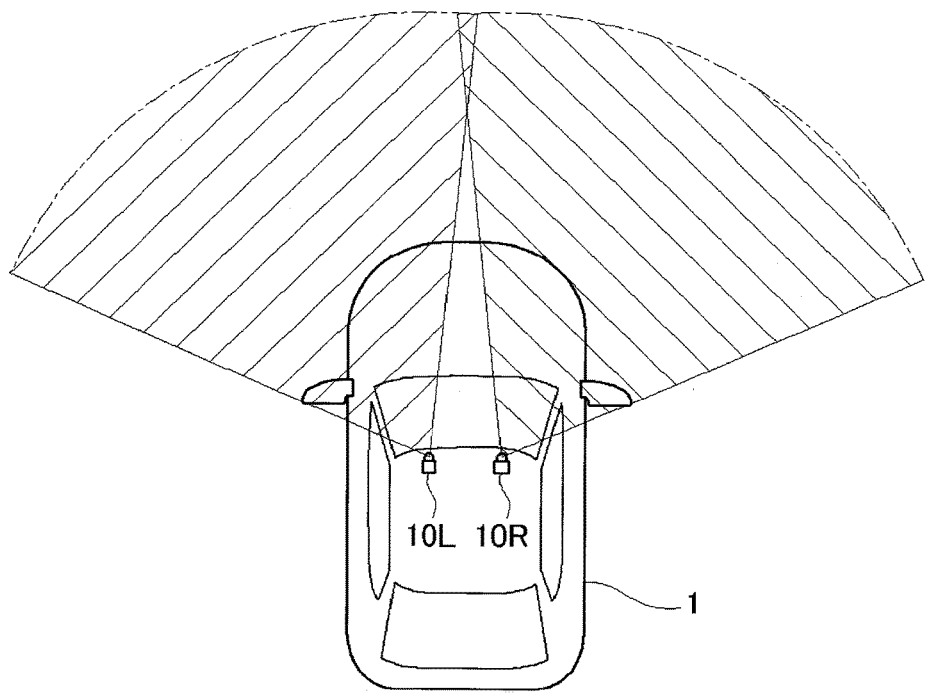
FIG. 18A is a diagram illustrating a second modification.
Figure 18B:
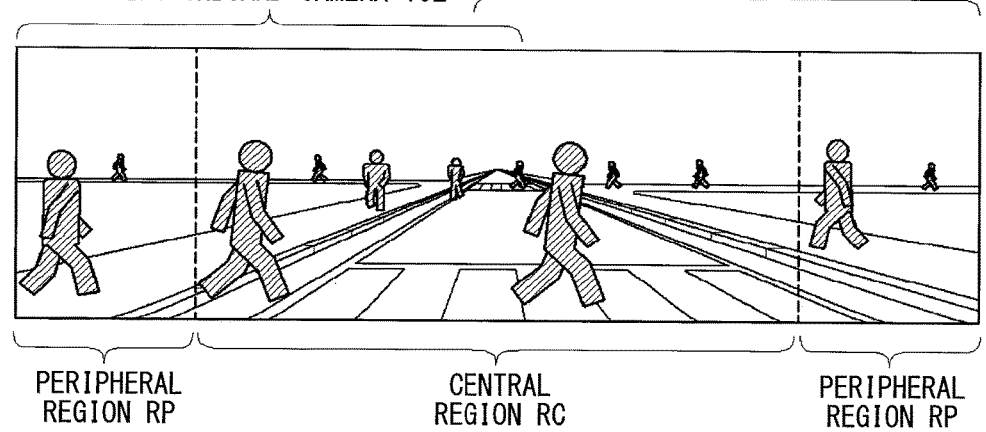
FIG. 18B is a diagram illustrating the second modification.

FIG. 18A and FIG. 18B show an example of a second modification. A vehicle 1 exemplified in FIG. 18A is equipped with two onboard cameras 10, namely, a left onboard camera 10L which captures a photographic image in front of the vehicle 1 on the left and a right onboard camera 1 OR which captures a photographic image in front of the vehicle 1 on the right. Photographic images captured by the left onboard camera 10L and the right onboard camera 1OR overlap partially.

An imaging portion 101 (referring to FIG. 2) of the second modification makes a single composite photographic image as shown in FIG. 18B by combining a photographic image captured by the left onboard camera 10L and a photographic image captured by the right onboard camera 10R. A moving object detection apparatus 100 may set a central region RC and peripheral regions RPs in the composite photographic image as shown in the drawing and perform the moving object detection processing of the first embodiment or the second embodiment for the central region RC and the peripheral regions RPs.

(Third Modification)

The first embodiment and the second embodiment above have described that a photographic image obtained by one or more than one onboard camera 10 is divided to the central region RC and the peripheral regions RPs. In a case where photographic images of the surrounding of a vehicle 1 are captured by three or more onboard cameras 10, photographic images captured by the respective onboard cameras 10 may be used as the central region RC or the peripheral regions RPs.

Figure 19:
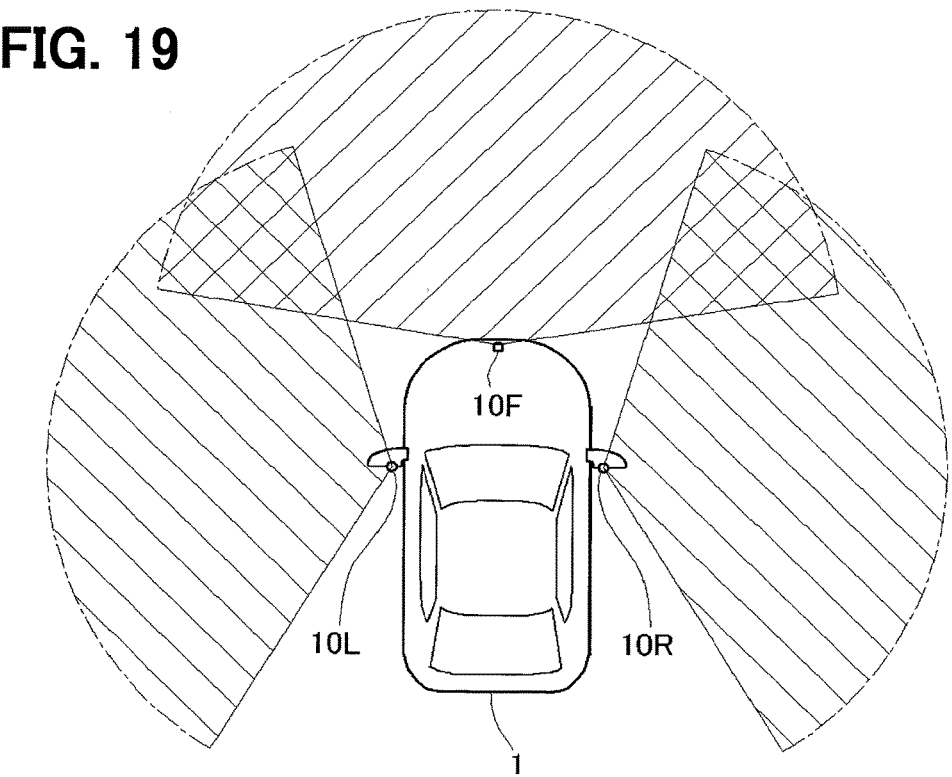
FIG. 19 is a diagram illustrating a third modification.

For example, a vehicle 1 shown in FIG. 19 includes a front onboard camera 10F which captures a photographic image in front of the vehicle 1, a left onboard camera 10L which captures a photographic image in a left direction of the vehicle 1, and a right onboard camera 10R which captures a photographic image in a right direction of the vehicle 1. In this case, the image captured by the front onboard camera 10F may be used as the central region RC of a photographic image, and images obtained by the left onboard camera 10L and the right onboard camera 10R may be used as the peripheral regions RPs of the photographic image. According to this configuration, a need to generate the central region RC and the peripheral regions RPs by dividing a photographic image may be eliminated. As shown in FIG. 19, by allowing imaging ranges of the left onboard camera 10L and the front onboard camera 10F to overlap partially, and allowing imaging ranges of the front onboard camera 10F and the right onboard camera 10R to overlap partially, the processing to widen the central region RC and the peripheral regions RP (S202 of FIG. 10 and S302 of FIG. 12, respectively) may be omitted when detecting a moving object. Consequently, it may be possible to detect a moving object in a photographic image quickly.

While the above has described the respective embodiments and modifications, it should be appreciated that the present disclosure is not limited to the embodiments and the modifications and can be implemented in various manners within the scope of the present disclosure.

In order to solve the problem discussed above, a moving object detection apparatus and a moving object detection method of the present disclosure are configured in such a manner that when a photographic image is obtained at a predetermined time interval, a moving object is detected in peripheral regions and also in a central region of the photographic image. A first moving object of a size smaller than a predetermined size and a second moving object of a size larger than the predetermined size are detected in the peripheral regions. By contrast, in the central region, the first moving object is detected whereas the second moving object is detected when the second moving object is detected in the peripheral region of a photographic image obtained at a previous time.

It is normally improbable that the second moving object of a size larger than the predetermined size suddenly appears in the central region of the photographic image. In most cases, the second moving object in the central region is a moving object which has been in the peripheral region before and moves over from the peripheral region. Hence, when the second moving object is detected in the peripheral region, by detecting the second moving object also in the central region in a photographic image obtained next, a time which is spent otherwise for detecting the second moving object in the central region can be saved. Hence, a moving object can be detected quickly.

The moving object detection apparatus of the present disclosure may be configured in such a manner that the first moving object and the second moving object are detected in the central region of a photographic image obtained next also when at least one of the first moving object and the second moving object has been detected in the central region of the photographic image obtained at a previous time.

When the first moving object is captured in the central region of the photographic image obtained at a previous time, it is likely that the same first moving object comes closer and appears larger. Also, when the second moving object is captured in the central region of the photographic image, it is highly likely that the second moving object is also in the central region of a photographic image obtained next. When at least one of the first moving object and the second moving object has been detected in the central region of the photographic image obtained at a previous time, by detecting the first moving object and the second moving object in the central region of a photographic image obtained next, each and every moving object can be detected without being overlooked and left undetected.

The moving object detection apparatus of the present disclosure may predict a detection result of a moving object in the photographic image obtained this time based on a detection result of the moving object in the photographic image obtained previous time and a detection result of the moving object in the photographic image obtained second previous time. When the moving object detection apparatus predicts that the second moving object is detected in the central region of the photographic image obtained this time, the moving object detection apparatus may detect the first moving object and the second moving object also in the central region.

A detection result of a moving object in the photographic image obtained this time can be predicted when detection results of the moving object in the photographic image obtained at a previous time and in the photographic image obtained second previous time are given. Hence, by detecting the first moving object and the second moving object also in the central region when it is predicted that the second moving object is detected in the central region of the photographic image obtained this time, it may be possible to eliminate wasteful detection of the second moving object. Hence, it may be possible to detect a moving object quickly.

The moving object detection apparatus of the present disclosure configured to predict whether the second moving object is detected in the central region of the photographic image obtained this time may predict a detection result as follows. When the second moving object is detected in the peripheral region of the photographic image obtained at a previous time, the moving object detection apparatus may predict whether the second moving object is detected in the central region of the photographic image obtained this time based on a position at which the moving object is detected in the photographic image obtained at a previous time and a position at which the moving object is detected in the photographic image obtained second previous time.

In most cases, the second moving object in the central region is a moving object which has been in the peripheral region before and moves over from the peripheral region. Hence, by predicting a detection result as above, whether the second moving object is detected in the central region of the photographic image obtained this time can be detected efficiently.

The moving object detection apparatus of the present disclosure configured to predict whether the second moving object is detected in the central region of the photographic image obtained this time may predict a detection result as follows. That is, when the moving object detection apparatus detects the first moving object in the central region, the moving object detection apparatus detects the first moving object while making a difference in size distinguishable. When the first moving object of a size larger than the predetermined size is detected in the central region of the photographic image obtained at a previous time, the moving object detection apparatus may predict that the second moving object is detected in the central region of the photographic image obtained this time.

According to this configuration, even in a case where the first moving object which is small in the central region of the photographic image obtained at the previous time comes closer and appears larger in the photographic image obtained this time, it may be possible to detect the same moving object without being overlooked.

The moving object detection apparatus of the present disclosure may be configured in such a manner that when a photographic image obtained at a previous time does not exist, the first moving object and the second moving object are detected also in the central region. The term, "a photographic image obtained at a previous time", shows a photographic image obtained at a predetermined time interval.

When a photographic image obtained at a previous time does not exist, it is unknown as to which size of a moving object is in which part of the photographic image. Hence, when configured as above, each and every moving object in the photographic image can be detected without being overlooked.

The moving object detection apparatus of the present disclosure may be configured in such a manner that a photographic image is generated by combining images captured by multiple onboard cameras and a moving object is detected by applying the method to the composite image thus obtained.

A photographic image of a wide span can be obtained by combining images captured by multiple onboard cameras. In this case, a time required to detect a moving object becomes longer as the span becomes wider. By applying the method to the photographic image of a wide span as above when detecting a moving object, it may be possible to detect the moving object quickly.

The moving object detection apparatus of the present disclosure may be configured in such a manner that the moving object detection apparatus skips detection in a lower region provided in a lower part of a photographic image when detecting the first moving object in the photographic image.

It is normal that a moving object appears large in the lower region of the photographic image and it is least likely that the first moving object is in the lower region. When the first moving object in the photographic image is detected, it may be possible to eliminate wasteful detection by skipping detection in the lower region. It may be possible to detect a moving object quickly.

The moving object detection apparatus of the present disclosure may be configured in such a manner that the moving object detection apparatus skips detection in an upper region provided in an upper part of a photographic image when detecting the second moving object in the photographic image.

It is normal that a moving object is small in the upper region of the photographic image and it is least likely that the second moving object is in the upper region. Hence, when the second moving object in the photographic image is detected, it may be possible to eliminate wasteful detection by skipping detection in the upper region. It may be possible to detect a moving object quickly.

The moving object detection apparatus of the present disclosure may be configured so as to detect a moving object as follows. That is, a first template representing a figure characteristic of the first moving object and a second template representing a figure characteristic of the second moving object are pre-stored. When the first moving object is detected, the moving object detection apparatus detects the first moving object by detecting a portion matching the first template in the photographic image. Also, when the second moving object is detected, the moving object detection apparatus detects the second moving object by detecting a portion matching the second template in the photographic image.

According to this configuration, it may be possible to detect a moving object in the photographic image surely.

It is noted that a flowchart or the processing of the flowchart in the present application includes multiple steps (also referred to as sections), each of which is represented, for instance, as S100. Further, each step can be divided into several sub-steps while several steps can be combined into a single step. Furthermore, each step can also be referred to as a device, module, or means.

While the embodiments, the configurations, and the modes according to the present disclosure have been described with reference to embodiments thereof, it is to be understood that embodiments, configuration, and modes according to the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A moving object detection apparatus that analyzes a photographic image captured by an onboard camera and detects a moving object in the photographic image, comprising:
   an imaging portion that captures the photographic image at a predetermined time interval;
   a storage portion that stores a first template representing a figure characteristic of a first moving object having a size smaller than a predetermined size, and stores a second template representing a figure characteristic of a second moving object having a size larger than the predetermined size,
   a peripheral region detection portion that compares the photographic image with the first template or the second template, and detects the first moving object and the second moving object as the moving object in a peripheral region provided on each of right and left sides in the photographic image; and
   a central region detection portion that detects the first moving object as the moving object in a central region provided at a center of the photographic image,
   wherein:
   the central region detection portion detects the first moving object and the second moving object as the moving object when the second moving object has been detected in the peripheral region of the photographic image obtained at a previous time.

2. The moving object detection apparatus according to claim 1, wherein:
   the central region detection portion detects the first moving object and the second moving object as the moving object when at least one of the first moving object and the second moving object has been detected in the central region of the photographic image obtained at the previous time.

3. The moving object detection apparatus according to claim 1, further comprising:
   a prediction portion that predicts a detection result of the moving object in the photographic image obtained this time based on a detection result of the moving object in the photographic image obtained at the previous time and on a detection result of the moving object in the photographic image obtained second previous time,
   wherein:
   the central region detection portion detects the first moving object and the second moving object as the moving object when the prediction portion has predicted that the second moving object is detected in the central region.

4. The moving object detection apparatus according to claim 3, wherein:
   the prediction portion predicts whether the second moving object is detected in the central region of the photographic image obtained this time based on a position at which the second moving object has been detected in the peripheral region of the photographic image obtained at the previous time and on a position at which the second moving object has been detected in the photographic image obtained second previous time,
when the second moving object has been detected in the peripheral region of the photographic image obtained at the previous time.

5. The moving object detection apparatus according to claim 3, wherein:
the central region detection portion detects the first moving object while distinguishing a difference in size; and
the prediction portion predicts that the second moving object is detected in the central region of the photographic image obtained this time
when the first moving object of the size larger than the predetermined size has been detected in the central region of the photographic image obtained at the previous time.

6. The moving object detection apparatus according to claim 1, wherein:
the central region detection portion detects the first moving object and the second moving object as the moving object when the photographic image obtained at the previous time is absent.

7. The moving object detection apparatus according to claim 1, further comprising:
a plurality of onboard cameras that capture images of adjacent regions,
wherein:
the imaging portion generates the photographic image by combining the images captured by the plurality of onboard cameras.

8. The moving object detection apparatus according to claim 1, wherein:
the peripheral region detection portion and the central region detection portion detect the moving object except for the first moving object at a lower region provided in a lower part of the photographic image.

9. The moving object detection apparatus according to claim 1, wherein:
the peripheral region detection portion and the central region detection portion detect the moving object except for the second moving object at an upper region provided in an upper part of the photographic image.

10. The moving object detection apparatus according to claim 1, further comprising:
a storage portion that stores a first template representing a figure characteristic of the first moving object and stores a second template representing a figure characteristic of the second moving object,
wherein:
the peripheral region detection portion and the central region detection portion detect the first moving object by detecting a portion matching the first template in the photographic image when the first moving object is detected; and
the peripheral region detection portion and the central region detection portion detect the second moving object by detecting a portion matching the second template in the photographic image when the second moving object is detected.

11. A moving object detection method of analyzing a photographic image captured by an onboard camera and detecting a moving object in the photographic image, comprising:
capturing the photographic image at a predetermined time interval;
setting a central region detection template for a central region and a peripheral region detection template for a peripheral region from a storage portion that stores a first template representing a figure characteristic of a first moving object having a size smaller than a predetermined size and stores a second template representing a figure characteristic of a second moving object having a size larger than the predetermined size;
detecting the first moving object and the second moving object as the moving object through comparison with the first template or the second template, in the peripheral region provided on each of right and left sides of the photographic image;
detecting the first moving object as the moving object through comparison with the first template, in a central region provided at a center of the photographic image; and
storing detection results of the detecting the first moving object and the second moving object in the peripheral region and the detecting the first moving object in the central region,
wherein:
the detecting the first moving object in the central region detects, in addition to the first moving object, the second moving object as the moving object when the second moving object has been detected in the peripheral region of the photographic image obtained at a previous time.

12. A moving object detection apparatus that analyzes a photographic image captured by an onboard camera connected to an imaging portion capturing the photographic image at a predetermined time interval, and detects a moving object in the photographic image, comprising:
a storage portion that stores a first template representing a figure characteristic of a first moving object having a size smaller than a predetermined size, and stores a second template representing a figure characteristic of a second moving object having a size larger than the predetermined size,
a peripheral region detection portion that compares the photographic image with the first template or the second template, and detects the first moving object and the second moving object in a peripheral region provided on each of right and left sides of the photographic image as the moving object; and
a central region detection portion that detects the first moving object in a central region provided at a center of the photographic image as the moving object,
wherein:
the central region detection portion detects the first moving object and the second moving object as the moving object when the second moving object has been detected in the peripheral region of the photographic image obtained at a previous time.

13. The moving object detection apparatus according to claim 12, further comprising:
a prediction portion that predicts a detection result of the moving object in the photographic image obtained this time based on a detection result of the moving object in the photographic image obtained at the previous time and on a detection result of the moving object in the photographic image obtained at a second previous time,
wherein the central region detection portion detects the first moving object and the second moving object as the moving object when the prediction portion has predicted that the second moving object is detected in the central region, wherein the central region detection portion detects the first moving object while distinguishing a difference in size, and wherein the prediction portion predicts that the second moving object is detected in the central region of the photographic image obtained this time when the first moving object of the size larger than the predetermined size has been detected in the central region of the photographic image obtained at the previous time.

14. A moving object detection apparatus that analyzes a photographic image captured by an onboard camera and detects a moving object in the photographic image, comprising:

an imaging portion that captures the photographic image at a predetermined time interval;

a storage portion that stores a first template representing a first figure characteristic of a first moving object having a size smaller than a predetermined size, and stores a second template representing a second figure characteristic of a second moving object having a size larger than the predetermined size;

a peripheral region detection portion that is configured to compare the photographic image with the first template and the second template, and detects the first moving object and the second moving object as the moving object in a peripheral region provided on each of right and left sides in the photographic image; and a central region detection portion that compares the first template with a central region provided at a center of the photographic image, wherein:

the central region detection portion compares the central region with the first template and the second template in response to the second moving object being detected in the peripheral region of a preceding photographic image obtained at a previous time.

* * * * *